United States Patent
He

(10) Patent No.: US 12,363,789 B2
(45) Date of Patent: Jul. 15, 2025

(54) DEVICE-SPECIFIC SYSTEM INFORMATION VALIDITY TIMES

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/841,505

(22) Filed: Jun. 15, 2022

(65) Prior Publication Data
US 2023/0413376 A1    Dec. 21, 2023

(51) Int. Cl.
*H04W 76/28*    (2018.01)
*H04W 52/02*    (2009.01)

(52) U.S. Cl.
CPC ....... *H04W 76/28* (2018.02); *H04W 52/0216* (2013.01)

(58) Field of Classification Search
CPC .......................... H04W 76/28; H04W 52/0216
See application file for complete search history.

(56) References Cited

U.S. PATENT DOCUMENTS

| | | | |
|---|---|---|---|
| 2021/0136661 A1* | 5/2021 | Frenger | H04W 48/14 |
| 2022/0046523 A1 | 2/2022 | Nam et al. | |
| 2022/0116982 A1 | 4/2022 | Lee et al. | |
| 2024/0313911 A1* | 9/2024 | Nimbalker | H04W 72/232 |

FOREIGN PATENT DOCUMENTS

WO    WO-2022060290 A1    3/2022

OTHER PUBLICATIONS

International Search Report and Written Opinion - PCT/US2023/067178 - ISA/EPO - 2023-09-08 (2204709WO).

* cited by examiner

*Primary Examiner* — Justin Y Lee
(74) *Attorney, Agent, or Firm* — Holland & Hart LLP

(57) ABSTRACT

Methods, systems, and devices for wireless communications are described. In some aspects, a user equipment (UE) and a network entity may support system information block (SIB) validity times that are device, deployment, or operation specific. For example, a network entity may transmit, to a UE, an indication of a SIB validity time that is specific to one or more of the UE, a device type of the UE, or a discontinuous reception (DRX) cycle associated with the UE. In some implementations, the network entity may transmit the indication of the SIB validity time that is specific to the UE via system information along with one or more other SIB validity times that may be specific to one or more other UEs. As such, different SIB validity times indicated via system information may correspond to different UEs, different device types, or different DRX cycles.

26 Claims, 15 Drawing Sheets

DEVICE-SPECIFIC SYSTEM INFORMATION VALIDITY TIMES

TECHNICAL FIELD

The following relates to wireless communications, including device-specific system information validity times.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support device-specific system information validity times. In some implementations, the described techniques provide for different system information block (SIB) validity times for different devices, devices associated with different device types, or devices associated with different discontinuous reception (DRX) cycles. For example, a network entity may transmit an indication of multiple SIB validity times via system information and a first user equipment (UE) that receives the system information may select a first SIB validity time, from the multiple SIB validity times, that is specific to one or more of the first UE, a device type of the first UE, or a DRX cycle associated with the first UE. A second UE that receives the system information may select a second SIB validity time, from the multiple SIB validity times, that is specific to one or more of the second UE, a device type of the second UE, or a DRX cycle associated with the second UE.

A method for wireless communication at a UE is described. The method may include receiving an indication of a system information validity time, where the system information validity time is specific to one or more of: the UE, a device type of the UE, or a DRX cycle associated with the UE, and monitoring for system information from a network entity in accordance with an expiration of the system information validity time at the UE.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the UE to receive an indication of a system information validity time, where the system information validity time is specific to one or more of: the UE, a device type of the UE, or a DRX cycle associated with the UE, and monitor for system information from a network entity in accordance with an expiration of the system information validity time at the UE.

Another apparatus for wireless communication at a UE is described. The apparatus may include means for receiving an indication of a system information validity time, where the system information validity time is specific to one or more of: the UE, a device type of the UE, or a DRX cycle associated with the UE, and means for monitoring for system information from a network entity in accordance with an expiration of the system information validity time at the UE.

A non-transitory computer-readable medium storing code for wireless communication at a UE is described. The code may include instructions executable by at least one processor to receive an indication of a system information validity time, where the system information validity time is specific to one or more of: the UE, a device type of the UE, or a DRX cycle associated with the UE, and monitor for system information from a network entity in accordance with an expiration of the system information validity time at the UE.

In some examples of the method, apparatuses, and non-transitory computer-readable medium described herein, receiving the indication of the system information validity time may include operations, features, means, or instructions for receiving an indication of a set of multiple system information validity times, where each respective system information validity time may be associated with a different device type, and where a selection of the system information validity time from the set of multiple system information validity times may be associated with the device type of the UE.

In some examples of the method, apparatuses, and non-transitory computer-readable medium described herein, a reduced capability device type may be associated with a first system information validity time of the set of multiple system information validity times and a non-reduced capability device type may be associated with a second system information validity time of the set of multiple system information validity times.

In some examples of the method, apparatuses, and non-transitory computer-readable medium described herein, receiving the indication of the system information validity time may include operations, features, means, or instructions for receiving an indication of a set of multiple system information validity times, where each respective system information validity time may be associated with a different DRX cycle length range, and where a selection of the system information validity time from the set of multiple system information validity times may be associated with a DRX cycle length of the DRX cycle associated with the UE.

In some examples of the method, apparatuses, and non-transitory computer-readable medium described herein, receiving the indication of the system information validity time may include operations, features, means, or instructions for retrieving, from a storage of the UE, the system information validity time from a set of multiple system information validity times, where each respective system information validity time may be associated with a different DRX cycle length range, and where a selection of the system information validity time from the set of multiple system information validity times may be associated with a DRX cycle length of the DRX cycle associated with the UE.

In some examples of the method, apparatuses, and non-transitory computer-readable medium described herein, receiving the indication of the system information validity time may include operations, features, means, or instructions for receiving an indication of a multiplier value and a first system information validity time, where the system information validity time may be equal to a larger of the first system information validity time and a product of a DRX cycle length of the DRX cycle associated with the UE and the multiplier value.

In some examples of the method, apparatuses, and non-transitory computer-readable medium described herein, the indication indicates a respective multiplier value and a respective first system information validity time for each DRX cycle length range of a set of multiple DRX cycle length ranges and the multiplier value and the first system information validity time that the UE uses to calculate the system information validity time may be associated with a DRX cycle length range that includes the DRX cycle length of the DRX cycle associated with the UE.

In some examples of the method, apparatuses, and non-transitory computer-readable medium described herein, receiving the indication of the system information validity time may include operations, features, means, or instructions for receiving the indication of the system information validity time from a core network entity or a radio access network entity in accordance with which of the core network entity or the radio access network entity configures a DRX mode at the UE, where the network entity includes one or both of the core network entity and the radio access network entity.

In some examples of the method, apparatuses, and non-transitory computer-readable medium described herein, receiving the indication of the system information validity time may include operations, features, means, or instructions for receiving a first indication of a first system information validity time from one of a core network entity or a radio access network entity in accordance with which of the core network entity or the radio access network entity configures a DRX mode at the UE and receiving a second indication of a second system information validity time via a system information message, where the system information validity time may be associated with a smaller of the first system information validity time and the second system information validity time.

A method for wireless communication at a network entity is described. The method may include transmitting, to a UE, an indication of a system information validity time, where the system information validity time is specific to one or more of: the UE, a device type of the UE, or a DRX cycle associated with the UE and transmitting system information in accordance with an expiration of the system information validity time at the UE.

An apparatus for wireless communication at a network entity is described. The apparatus may include at least one processor, memory coupled (e.g., operatively, communicatively, functionally, electronically, or electrically) to the at least one processor, and instructions stored in the memory. The instructions may be executable by the at least one processor to cause the network entity to transmit, to a UE, an indication of a system information validity time, where the system information validity time is specific to one or more of: the UE, a device type of the UE, or a DRX cycle associated with the UE, and transmit system information in accordance with an expiration of the system information validity time at the UE.

Another apparatus for wireless communication at a network entity is described. The apparatus may include means for transmitting, to a UE, an indication of a system information validity time, where the system information validity time is specific to one or more of: the UE, a device type of the UE, or a DRX cycle associated with the UE, and means for transmitting system information in accordance with an expiration of the system information validity time at the UE.

A non-transitory computer-readable medium storing code for wireless communication at a network entity is described. The code may include instructions executable by at least one processor to transmit, to a UE, an indication of a system information validity time, where the system information validity time is specific to one or more of: the UE, a device type of the UE, or a DRX cycle associated with the UE, and transmit system information in accordance with an expiration of the system information validity time at the UE.

In some examples of the method, apparatuses, and non-transitory computer-readable medium described herein, transmitting the indication of the system information validity time may include operations, features, means, or instructions for transmitting an indication of a set of multiple system information validity times, where each respective system information validity time may be associated with a different device type, and where a selection of the system information validity time from the set of multiple system information validity times may be associated with the device type of the UE.

In some examples of the method, apparatuses, and non-transitory computer-readable medium described herein, a reduced capability device type may be associated with a first system information validity time of the set of multiple system information validity times and a non-reduced capability device type may be associated with a second system information validity time of the set of multiple system information validity times.

In some examples of the method, apparatuses, and non-transitory computer-readable medium described herein, transmitting the indication of the system information validity time may include operations, features, means, or instructions for transmitting an indication of a set of multiple system information validity times, where each respective system information validity time may be associated with a different DRX cycle length range, and where a selection of the system information validity time from the set of multiple system information validity times may be associated with a DRX cycle length of the DRX cycle associated with the UE.

In some examples of the method, apparatuses, and non-transitory computer-readable medium described herein, transmitting the indication of the system information validity time may include operations, features, means, or instructions for transmitting an indication of a multiplier value and a first system information validity time, where the system information validity time may be equal to a larger of the first system information validity time and a product of a DRX cycle length of the DRX cycle associated with the UE and the multiplier value.

In some examples of the method, apparatuses, and non-transitory computer-readable medium described herein, the indication indicates a respective multiplier value and a respective first system information validity time for each DRX cycle length range of a set of multiple DRX cycle length ranges and the multiplier value and the first system information validity time associated with the system information validity time may be associated with a DRX cycle length range that includes the DRX cycle length of the DRX cycle associated with the UE.

In some examples of the method, apparatuses, and non-transitory computer-readable medium described herein, transmitting the indication of the system information validity time may include operations, features, means, or instructions for transmitting the indication of the system information validity time via a core network entity or a radio access network entity in accordance with which of the core network entity or the radio access network entity configures a DRX mode at the UE, where the network entity includes one or both of the core network entity and the radio access network entity.

In some examples of the method, apparatuses, and non-transitory computer-readable medium described herein, transmitting the indication of the system information validity time may include operations, features, means, or instructions for transmitting a first indication of a first system information validity time via one of a core network entity or a radio access network entity in accordance with which of the core network entity or the radio access network entity configures a DRX mode at the UE and transmitting a second indication of a second system information validity time via a system information message, where the system information validity time may be associated with a smaller of the first system information validity time and the second system information validity time.

DETAILED DESCRIPTION

Figure 1:
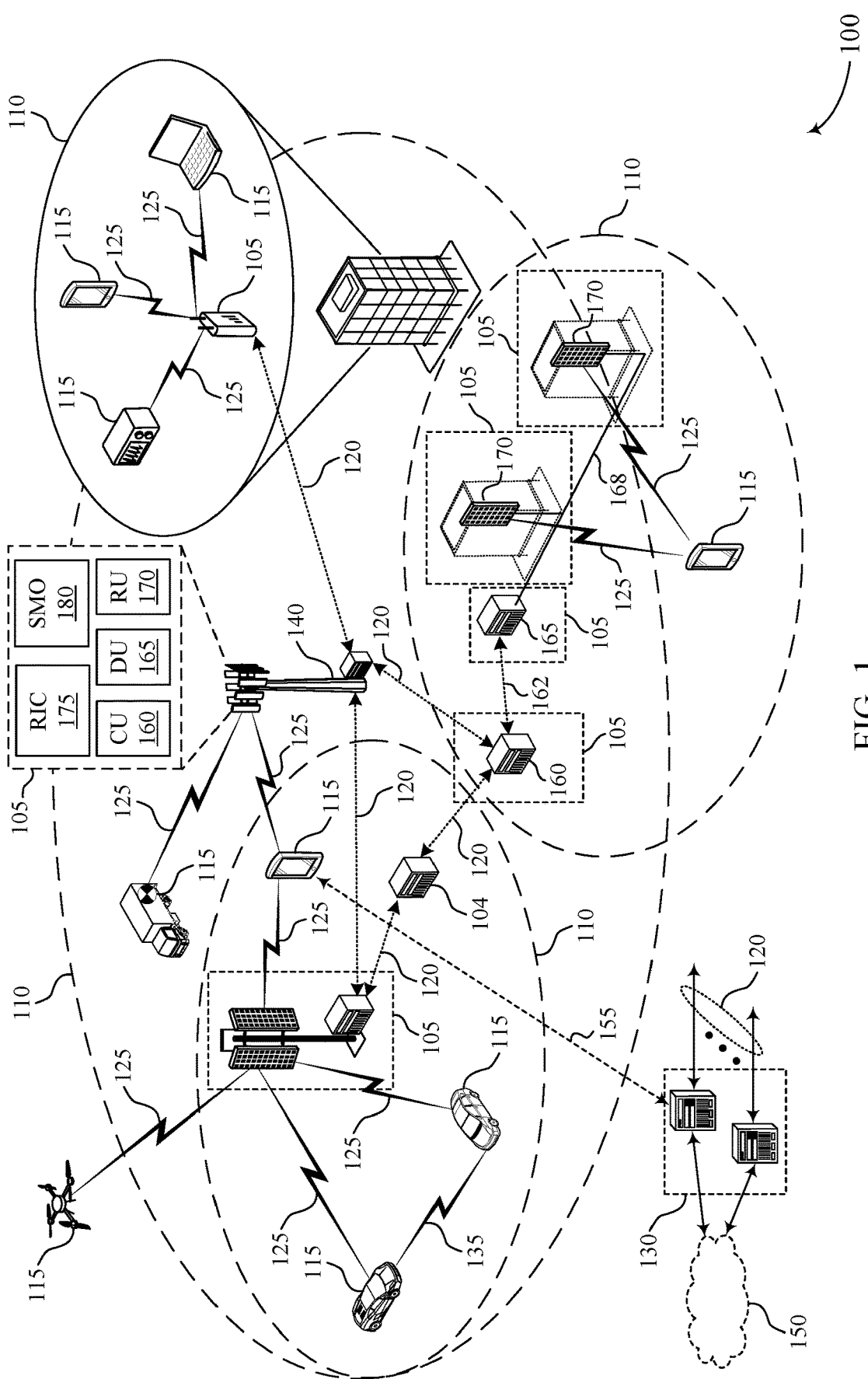
FIG. 1 illustrates an example of a wireless communications system that supports device-specific system information validity times in accordance with one or more aspects of the present disclosure.

In some wireless communications systems, various devices, such as user equipment (UEs), may monitor for system information broadcasts from a network entity and use the system information conveyed via the system information broadcasts to establish a connection with the network entity. In some aspects, a UE may receive system information from the network entity via one or more system information blocks (SIBs), store the system information conveyed via the one or more SIBs for a fixed time duration, and may re-acquire system information from the network entity upon expiration of the fixed time duration. In other words, the UE may expect acquired system information to be valid for the fixed time duration and, as such, the fixed time duration may be understood or referred to as a SIB validity time. In some systems, each UE in a system may use a same SIB validity time. In some deployments, however, different UEs may support different operations, such as different discontinuous reception (DRX) cycles, that are associated with different time durations during which a UE may be in a sleep mode. As such, use of a common SIB validity time for each device in a system may result in some UEs waking up to monitor system information more or less frequently than suitable for a given UE operation.

In some implementations of the present disclosure, a UE and a network entity may support a signaling mechanism associated with indicating a SIB validity time that is device, deployment, or operation specific. For example, the network entity may transmit, to the UE, an indication of a SIB validity time that is specific to one or more of the UE, a device type of the UE, or a DRX cycle associated with the UE. The network entity may explicitly indicate the SIB validity time that is specific to the UE or may implicitly indicate the SIB validity time that is specific to the UE (e.g., via a multiplier value that the UE may apply to a DRX cycle length associated with the UE). In some implementations, the network entity may transmit the indication of the SIB validity time that is specific to the UE via system information along with one or more other SIB validity times that may be specific to one or more other UEs. In such implementations, the multiple SIB validity times that the network entity indicates via the system information may each be associated with different devices, different device types, or different DRX cycles, or any combination thereof. As such, each UE in a system may monitor or search for updated system information from the network entity in accordance with a frequency, rate, or periodicity that is specific to a device type, deployment, or operation of that UE.

Particular implementations of the subject matter described in this disclosure can be implemented to realize one or more of the following potential advantages. For example, in accordance with monitoring or searching for updated system information in accordance with a frequency, rate, or periodicity that is specific to a device type, deployment, or operation of a UE, the UE may more suitably allocate resources (e.g., power or battery resources) to system information acquisition based on the device type, deployment, or operation of the UE. As such, the UE may consume less power and experience longer battery life. Likewise, the subject matter described in this disclosure may facilitate greater performance of low power or low complexity devices, such as low power internet of things (IoT) devices, NR-IoT devices, industrial IoT (IIoT) devices, or lower-tier devices, which may facilitate greater adoption of system deployments involving such devices. Greater adoption of such system deployments may increase system capacity, data rates, and system connectivity.

Aspects of the disclosure are initially described in the context of wireless communications systems. Aspects of the disclosure are additionally illustrated by and described with reference to a signaling diagram, a system information acquisition timeline, and a process flow. Aspects of the disclosure are further illustrated by and described with reference to apparatus diagrams, system diagrams, and flowcharts that relate to device-specific system information validity times.

FIG. 1 illustrates an example of a wireless communications system 100 that supports device-specific system information validity times in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. Components within a wireless communication system may be coupled (for example, operatively, communicatively, functionally, electronically, and/or electrically) to each other.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or a computing system may include disclosure of the UE 115, network entity 105, apparatus, device, or a computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support device-specific system information validity times as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some implementations, a UE 115 and a network entity 105 may support a signaling mechanism associated with indicating a SIB validity time that is specific to one or more of a device, a deployment, or an operation. For example, the network entity 105 may transmit to the UE 115 an indication of a SIB validity time that is specific to one or more of the UE 115, a device type or classification of the UE 115, or a DRX cycle associated with the UE 115. The network entity 105 may explicitly indicate the SIB validity time that is specific to the UE 115 or may implicitly indicate the SIB validity time that is specific to the UE 115 (e.g., via a multiplier value that the UE may apply to a DRX cycle length associated with the UE). In some implementations, the network entity 105 may transmit the indication of the SIB validity time that is specific to the UE 115 via system information (e.g., SIB1, SIB2, SIB3, SIB4, SIB5, SIB6, SIB7, SIB8, SIB9, SIB10, or SIB11) along with one or more other SIB validity times that may be specific to one or more other UEs 115. In such implementations, the multiple SIB validity times that the network entity 105 indicates via the system information may each be associated with different devices, different device types, or different DRX cycles, or any combination thereof. As such, each UE 115 in a system may monitor or search for updated system information from the network entity 105 in accordance with a frequency, rate, or periodicity that is specific to a device type, deployment, or operation of that UE 115.

Figure 2:
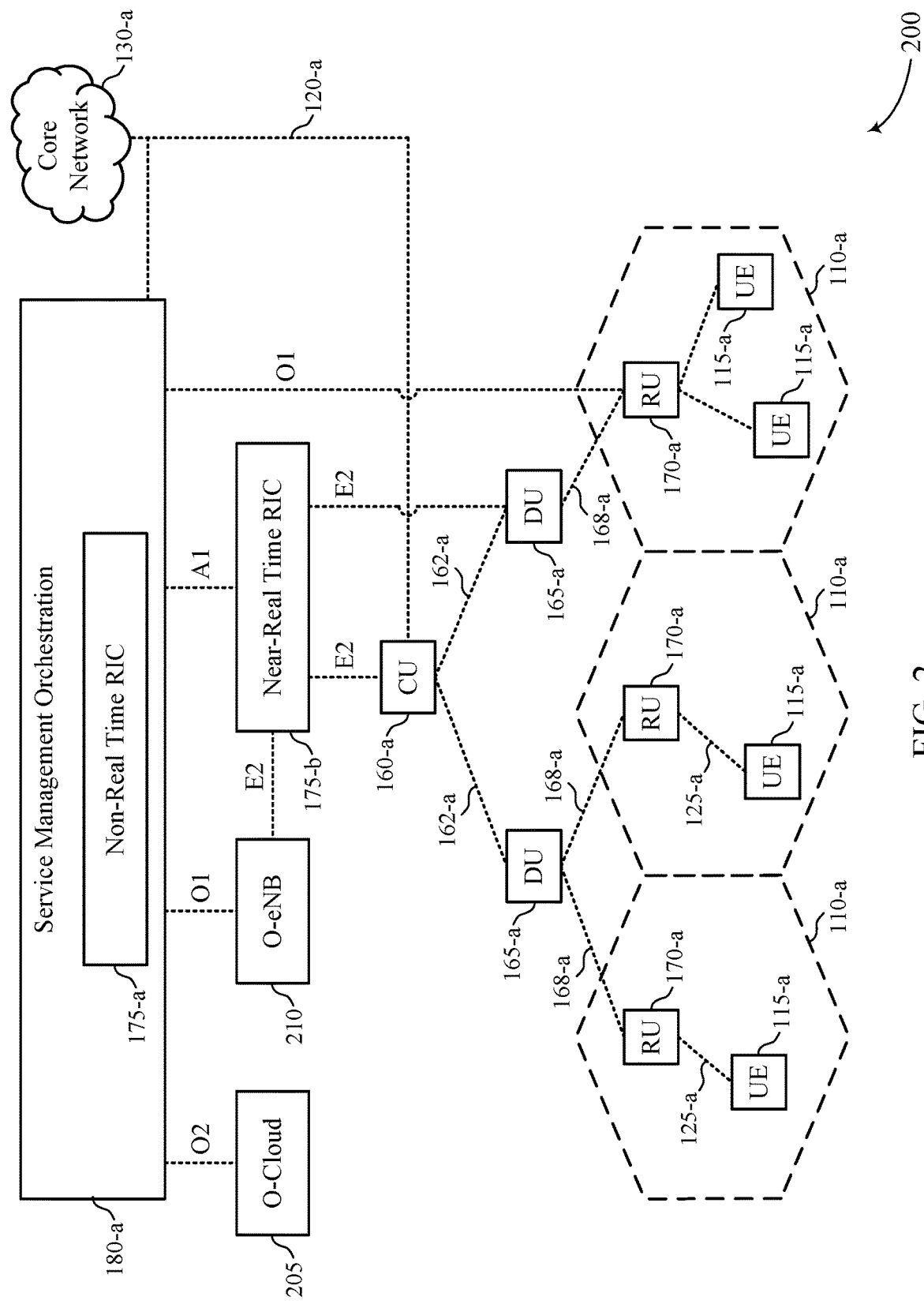
FIG. 2 illustrates an example of a network architecture that supports device-specific system information validity times in accordance with one or more aspects of the present disclosure.

FIG. 2 illustrates an example of a network architecture 200 (e.g., a disaggregated base station architecture, a disaggregated RAN architecture) that supports device-specific system information validity times in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, or an SDAP. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, or modulation and demodulation) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, or physical random access channel (PRACH) extraction and filtering), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage constraints or requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to, coupled with, or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

In some implementations, a UE 115-a and a network entity 105 may support a signaling mechanism associated with indicating a SIB validity time that is device, deployment, or operation specific. For example, the network entity 105 may transmit, to the UE 115-a, an indication of a SIB validity time that is specific to one or more of the UE 115-a, a device type or classification of the UE 115-a, or a DRX cycle associated with the UE 115-a. The network entity 105 may explicitly indicate the SIB validity time that is specific to the UE 115-a or may implicitly indicate the SIB validity time that is specific to the UE 115-a (e.g., via a multiplier value that the UE may apply to a DRX cycle length of the DRX cycle associated with the UE).

In some implementations, the UE 115-a may receive the indication of the SIB validity time that is specific to the UE 115-a via a network node that configures an operation of the UE 115-a (e.g., a network node that configures DRX, enhanced DRX (eDRX), or idle state DRX (I-DRX) operation at the UE 115-a). For example, if the UE 115-a is in an RRC idle state (e.g., RRC_IDLE), DRX, eDRX, or I-DRX may be configured at the UE 115-a by the core network 130-a. Accordingly, in such examples, the core network 130-*a* may indicate, to the UE 115-*a*, the SIB validity time that is specific to the UE 115-*a*. If the UE 115-*a* is in an RRC inactive state (e.g., RRC_INACTIVE), DRX, eDRX, or I-DRX may be configured at the UE 115-*a* by a RAN entity or node. As such, the RAN entity or node may indicate, to the UE 115-*a*, the SIB validity time that is specific to the UE 115-*a*. In other words, when DRX or eDRX is configured at the UE 115-*a*, the core network 130-*a* or the RAN entity or node may additionally configure a SIB validity time that is specific to the UE 115-*a* (e.g., specific to the DRX, eDRX, or I-DRX operation or mode configured at the UE 115-*a*). In such implementations, a network entity 105 may refer to one or both of the core network 130-*a* and the RAN entity or node.

In some implementations, the UE 115-*a* may receive a first indication of a first SIB validity time from one of the core network 130-*a* or the RAN entity or node (e.g., when the core network 130-*a* or the RAN entity or node configures the DRX, eDRX, or I-DRX operation or mode at the UE 115-*a*) and may receive a second indication of a second SIB validity time via system information (e.g., via SIB1). In such implementations, the first SIB validity time and the second SIB validity time may be the same or may be different. In scenarios in which the first SIB validity time and the second SIB validity time are different, the UE 115-*a* may select a final SIB validity time (e.g., the SIB validity time that the UE 115-*a* is to use to determine when to monitor or search for updated system information) as a smaller of the first SIB validity time and the second SIB validity time. In other words, the UE 115-*a* may select and use a minimum of a) the first SIB validity time configured by the core network 130-*a* or the RAN entity or node and b) the second SIB validity time advertised in system information.

Figure 3:
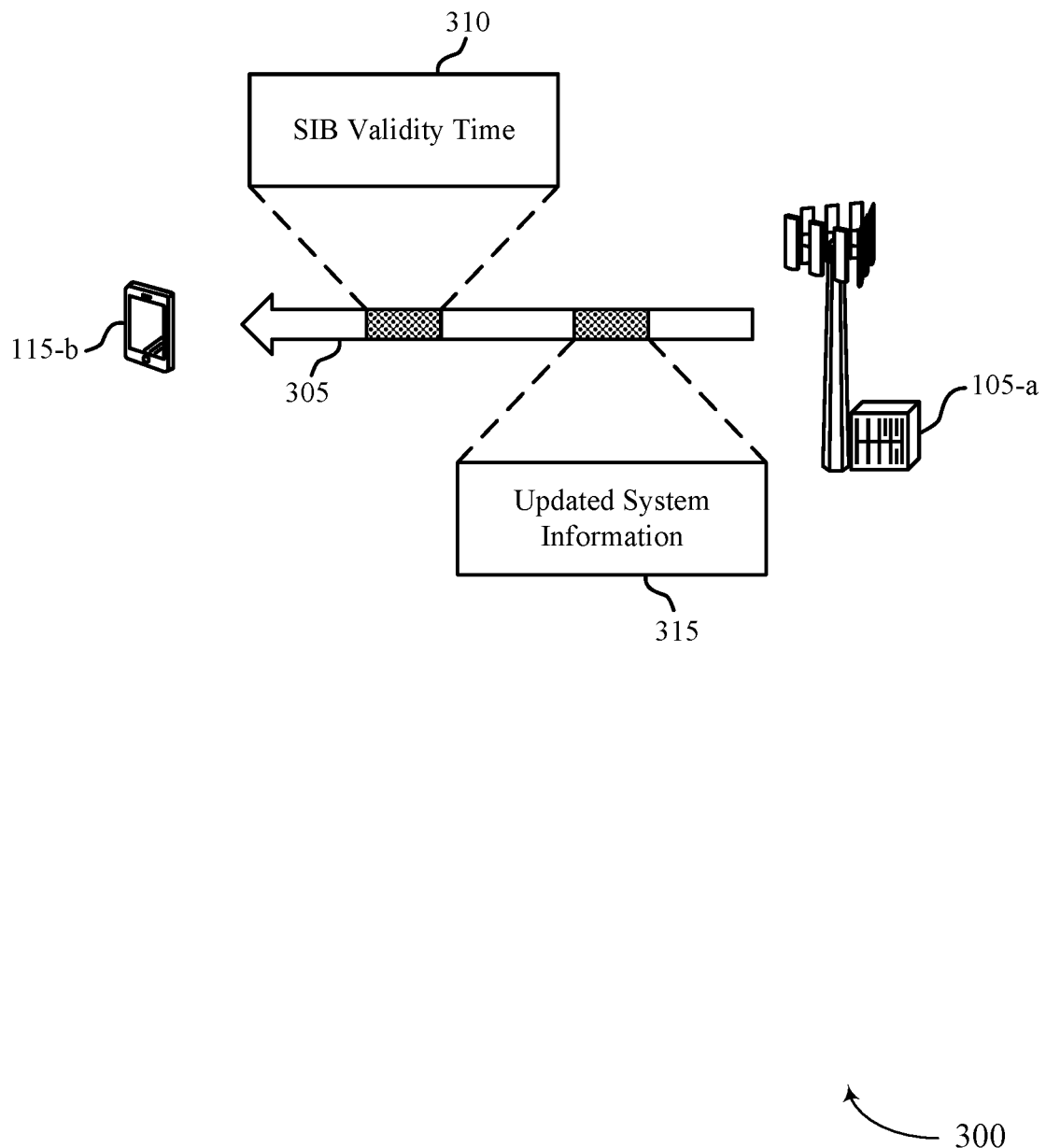
FIG. 3 illustrates an example of a signaling diagram that supports device-specific system information validity times in accordance with one or more aspects of the present disclosure.

FIG. 3 illustrates an example of a signaling diagram 300 that supports device-specific system information validity times in accordance with one or more aspects of the present disclosure. The signaling diagram 300 may implement or be implemented to realize aspects of the wireless communications system 100 or the network architecture 200. For example, the signaling diagram 300 illustrates communication between a UE 115-*b* and a network entity 105-*a*, each of which may be examples of corresponding devices described herein. For example, the UE 115-*b* may be an example of a UE 115 or a UE 115-*a* as illustrated by and described with reference to FIGS. 1 and 2, respectively. Similarly, the network entity 105-*a* may be an example of a network entity 105 as illustrated by or described with reference to FIG. 1 or 2. In some implementations, the UE 115-*b* and the network entity 105-*a* may support a signaling mechanism associated with enabling or facilitating device-specific SIB validity times.

A SIB validity time may refer to a duration in which the UE 115-*b* may consider or expect that acquired and stored (e.g., cached) system information (e.g., one or more SIBs that the UE 115-*b* has acquired from the network entity 105-*a* and stored at the UE 115-*b*) is still valid. As such, at an end or upon expiration of a SIB validity time, the UE 115-*b* may re-acquire system information (e.g., one or more SIBs) from the network entity 105-*a*. In some systems, a network entity 105 and various UEs 115 may support or be configured with a same, fixed SIB validity time. In an NR system, for example, SIB validity time may be fixed for all UEs 115 (e.g., SIB validity time may be fixed at 3 hours in NR systems). In an LTE system, SIB validity time may be fixed at a first value for all UEs 115 that are not narrowband IoT (NB-IoT) UEs 115 configured with eDRX and may be fixed at a second value for all UEs 115 that are NB-IoT UEs 115 configured with eDRX. In such an LTE system, the first value may be 3 hours and the second value may be 24 hours, as NB-IoT UEs 115 may be configured with a maximum or upper limit eDRX cycle length of 3 hours.

In some systems, some UEs 115 (e.g., NR UEs 115) may be configured with DRX, eDRX, or I-DRX operational modes (which may collectively be referred to herein as a DRX operational mode; further, although described sometimes in the context of DRX or eDRX, the implementations described herein may be equally applicable to UE-specific I-DRX cycles as well, such as for UEs 115 that are not configured with eDRX) and a maximum or upper limit DRX cycle (e.g., eDRX cycle) in an RRC idle state may be up to 3 hours. A maximum or upper limit DRX cycle (e.g., eDRX cycle) for an RRC inactive state, however, may be approximately 10 seconds (e.g., approximately 10.24 seconds). Further, although all or at least a set of NR UEs 115 may be configured with eDRX, different types or classifications of UEs 115 may be expected to have or support different maximum or upper limit DRX cycle (e.g., eDRX cycle) lengths.

For example, an enhanced mobile broadband (eMBB) UE 115 may be unlikely to support a DRX cycle length that is longer than approximately 2 seconds (e.g., longer than approximately 2.56 seconds) in either an RRC idle or an RRC inactive state due, in part, to a constraint on the eMBB UE 115 to receive earthquake and tsunami warning system (ETWS) or commercial mobile alert system (CMAS) notifications within a fixed, relatively short, time period (e.g., within approximately 4 seconds). On the other hand, a reduced capability (RedCap) UE 115 operating in an IoT application may be expected to have a relatively longer (e.g., much longer) DRX cycle length (e.g., a DRX, such as eDRX, cycle length of between approximately 10 seconds and approximately 3 hours). As such, it may be unsuitable to have a fixed value for a SIB validity time (e.g., defined in a specification) for all or at least a set of UEs 115 (e.g., all or at least a set of NR UEs 115).

Accordingly, in some implementations, the UE 115-*b* and the network entity 105-*a* may support a design for SIB validity time that accounts for deployment or operational variations across UEs 115. In other words, the UE 115-*b* and the network entity 105-*a* may support one or more signaling or operational mechanisms according to which the network entity 105-*a* may indicate different SIB validity times to different UEs 115 and according to which the UE 115-*b* may expect to receive an indication of a SIB validity time that is specific to the UE 115-*b*. For example, the network entity 105-*a* may transmit, to the UE 115-*b* via a communication link 305, an indication of a SIB validity time 310 that is specific to one or more of the UE 115-*b*, a device type of the UE 115-*b*, or a DRX (e.g., an eDRX or I-DRX) cycle associated with the UE 115-*b*.

In some examples, the network entity 105-*a* may advertise (e.g., transmit or indicate) different SIB validity times for different UE types, device types, or classification types via system information (e.g., via a first SIB, such as SIB1). For example, the network entity 105-*a* may include multiple different SIB validity times in a system information broadcast and each of the multiple different SIB validity times may correspond to a different UE type, device type, or classification type. For instance, the multiple different SIB validity times may include a first SIB validity time associated with (e.g., to be used by) non-RedCap UEs 115 (e.g., eMBB UEs 115) and a second SIB validity time associated with (e.g., to be used by) RedCap UEs 115. As such, a device type or classification type may correspond to one or more of a RedCap UE 115, a non-RedCap UE 115, or an eMBB UE 115. Additional device types or classification types may include a latency-sensitive UE 115, a non-latency sensitive UE 115, a low mobility UE 115, a high mobility UE 115, an IIoT UE 115, or a non-IIoT UE 115, and each of such device types or classification types may be associated with a different SIB validity time. In some implementations, the network entity 105-*a* may further indicate a mapping such that the UE 115-*b* may determine which of the multiple different SIB validity times indicated in the system information broadcast (e.g., the SIB validity time 310) corresponds to the UE 115-*b* or a device type of the UE 115-*b*. In some other implementations, the UE 115-*b* may store such a mapping (e.g., in a memory of the UE 115-*b*). The UE 115-*b* may select or identify the SIB validity time 310 from the multiple different SIB validity times conveyed via the system information accordingly.

Additionally, or alternatively, the network entity 105-*a* may advertise (e.g., transmit or indicate) different SIB validity times for different DRX cycles (e.g., different eDRX or I-DRX cycles) via system information (such that a SIB validity time may be a function of an eDRX or I-DRX cycle). In some examples, the network entity 105-*a* may separate supported DRX cycle lengths into multiple different ranges and may assign a different SIB validity time to each different range (e.g., the network entity 105-*a* may indicate a respective SIB validity time for each different range). For example, the network entity 105-*a* may separate DRX cycle lengths into a first range of approximately 2.56 seconds to approximately 10.24 seconds, a second range of approximately 10.24 seconds to approximately 1 minute, a third range of approximately 1 minute to 3 hours, and a fourth range from approximately 3 hours to approximately 24 hours and may indicate a respective SIB validity time for each of the first range, the second range, the third range, and the fourth range. In some implementations, the network entity 105-*a* may further indicate a mapping such that the UE 115-*b* may determine how different SIB validity times indicated in the system information broadcast correspond to different DRX cycle length ranges. In some other implementations, the UE 115-*b* may store such a mapping (e.g., in a memory of the UE 115-*b*). As such, the UE 115-*b* may select the SIB validity time 310 from the multiple different SIB validity times in accordance with the mapping and a DRX cycle length of the UE 115-*b*. Further, although deployments or operations are described herein in the context of DRX cycles, different example deployments or operations may include or otherwise be associated with running different types of applications, using different radio access technologies (RATs), or establishing different connection types (e.g., a sidelink-capable UE 115 may be associated with a different operations, and thus a potentially different SIB validity timer, than a UE 115 that is not capable of sidelink communication).

Additionally, or alternatively, the network entity 105-*a* may indicate the SIB validity time 310 that is specific to the UE 115-*b* as a multiple of a DRX cycle length of the DRX cycle associated with the UE 115-*b* (e.g., as a multiple of a DRX, such as an eDRX, cycle of the UE 115-*b*). Such an indication of the SIB validity time 310 may be referred to herein as an implicit indication of the SIB validity time 310. In some examples, the UE 115-*b* and the network entity 105-*a* may support a SIB validity time selection procedure according to which the SIB validity time 310 that is specific to the UE 115-*b* may be selected from a first SIB validity time $VT_{max}$ (which may define or indicate an optional maximum or upper limit length of validity time) and a product of a multiplier value M and the DRX cycle length of the DRX cycle associated with the UE 115-*b*. For example, the SIB validity time 310 that is specific to the UE 115-*b* may be equal to a larger of the first SIB validity time $VT_{max}$ (if indicated) and the product of the multiplier value M and the DRX cycle length.

In some implementations, the network entity 105-*a* may transmit an indication of the first SIB validity time $VT_{max}$ or the multiplier value M, or both, to the UE 115-*b* via system information (e.g., via a first SIB, such as SIB1). Further, in some implementations, the network entity 105-*a* may configure and indicate multiple different values of M and $VT_{max}$ for different ranges of DRX cycle lengths. For example, the network entity 105-*a* may assign or indicate a first M and $VT_{max}$ pair for a first range of DRX cycle lengths, a second M and $VT_{max}$ pair for a second range of DRX cycle lengths, and a third M and $VT_{max}$ pair for a third range of DRX cycle lengths and may indicate each of the first M and $VT_{max}$ pair, the second M and $VT_{max}$ pair, and the third M and $VT_{max}$ pair via system information (e.g., the first SIB, such as SIB1). In some implementations, the network entity 105-*a* may further indicate a mapping such that the UE 115-*b* may determine how different M and $VT_{max}$ pairs indicated in the system information broadcast correspond to different DRX cycle length ranges. In some other implementations, the UE 115-*b* may store such a mapping (e.g., in a memory of the UE 115-*b*). As such, the UE 115-*b* may select the M and $VT_{max}$ pair from the multiple different M and $VT_{max}$ pairs in accordance with the mapping and a DRX cycle length of the UE 115-*b*. Accordingly, the UE 115-*b* may select, calculate, obtain, or otherwise determine the SIB validity time 310 using the selected M and $VT_{max}$ pair and the DRX cycle length of the UE 115-*b*.

As such, the UE 115-*b* may acquire system information (such as the system information via which the SIB validity time 310 is indicated) and may store the acquired system information for a time duration that may span up to the SIB validity time 310. Upon expiration of the time duration (which may be at most the SIB validity time 310), the UE 115-*b* may monitor or search for updated system information 315 from the network entity 105-*a*. In some implementations, the UE 115-*b* may acquire the updated system information and may store the updated system information for a time duration that may span up to the SIB validity time 310. In some other implementations, the UE 115-*b* may receive an indication of an updated SIB validity time that is specific to the UE 115-*b* via the updated system information 315 and may store the updated system information for a time duration that may span up to the updated SIB validity time.

Figure 4:
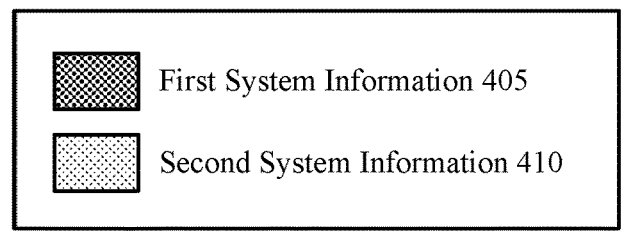
FIG. 4 illustrates an example of a system information acquisition timeline that supports device-specific system information validity times in accordance with one or more aspects of the present disclosure.
Figure 4:
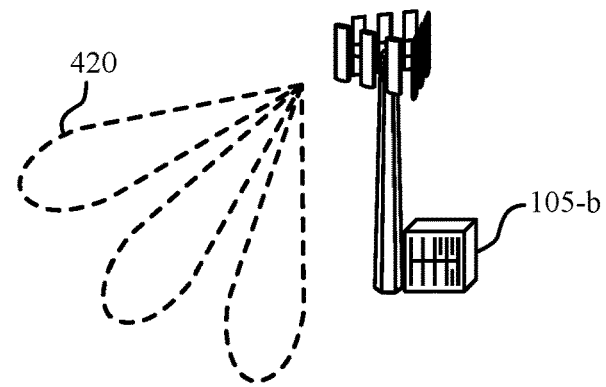
Figure 4:
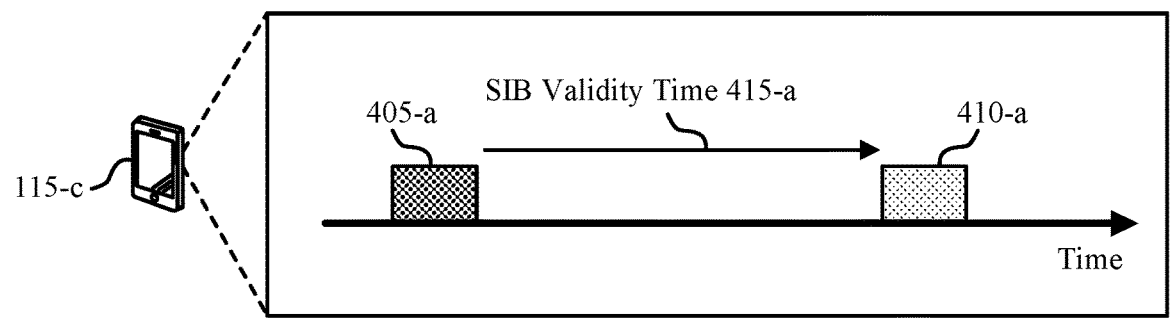
Figure 4:
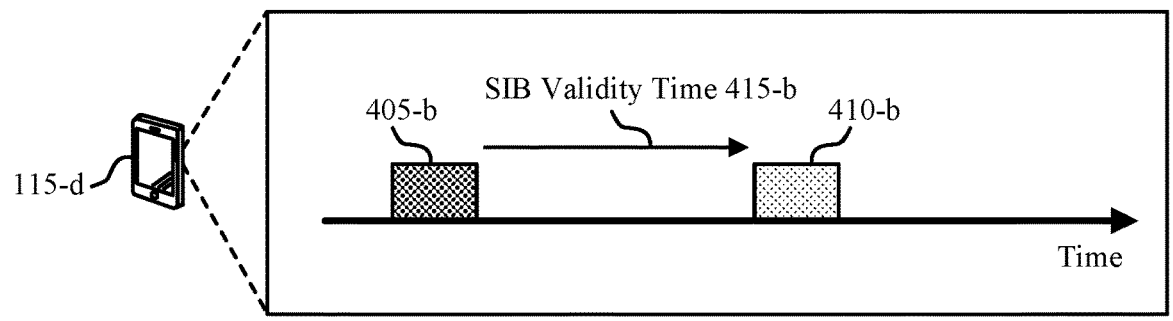

FIG. 4 illustrates an example of a system information acquisition timeline 400 that supports device-specific system information validity times in accordance with one or more aspects of the present disclosure. The system information acquisition timeline 400 may implement or be implemented to realize aspects of the wireless communications system 100, the network architecture 200, or the signaling diagram 300. For example, the system information acquisition timeline 400 illustrates communication between a network entity 105-*b* and a UE 115-*c* and a UE 115-*d*, each of which may be examples of corresponding devices described herein. In some implementations, the network entity 105-*b* may indicate (e.g., via a system information broadcast) multiple SIB validity times 415 (which may generally refer to the SIB validity time 415-*a* and the SIB validity time 415-*b*) and each of the multiple SIB validity times 415 may be associated with different UEs 115, different device types, or different DRX cycles.

For example, the network entity 105-*b* may indicate a set of SIB validity times 415 including the SIB validity time 415-*a* and the SIB validity time 415-*b*. In some implementations, the network entity 105-*b* may indicate the SIB validity times 415 via system information, such as first system information 405, which the network entity 105-*b* may transmit via one or more beams 420. Additionally, or alternatively, the UE 115-*c* and the UE 115-*d* may store one or more SIB validity times 415 and each may select a respective SIB validity time 415 from the stored one or more system information validity times 415. In some implementations, the UE 115-*c* and the UE 115-*d* may select SIB validity times 415 in accordance with a rule or specification. For example, different SIB validity times 415 may be associated with different DRX or eDRX cycles (where such association may be provided by a rule or specification stored at or otherwise known by a UE 115). As such, the UE 115-*c* may select the SIB validity time 415-*a* in accordance with a DRX cycle length of the UE 115-*c* and the rule or specification and the UE 115-*d* may select the SIB validity time 415-*b* in accordance with a DRX cycle length of the UE 115-*d* and the rule or specification.

As shown in the system information acquisition timeline 400, the UE 115-*c* may determine to use the SIB validity time 415-*a* and the UE 115-*d* may determine to use the SIB validity time 415-*b*. Accordingly, the UE 115-*c* may store the first system information 405 for up to a duration associated with the SIB validity time 415-*a* prior to monitoring for second system information 410 and the UE 115-*d* may store the first system information 405 for up to duration associated with the SIB validity time 415-*b* prior to monitoring for second system information 410.

As such, the UE 115-*c* may receive first system information 405-*a* and may store and use the first system information 405-*a* for a first time duration associated with the SIB validity time 415-*a* (such that the first time duration avoids exceeding the SIB validity time 415-*a*). Upon expiration of the first time duration (e.g., upon expiration of the SIB validity time 415-*a* relative to the reception of the first system information 405-*a*, the UE 115-*c* may monitor or search for second system information 410-*a*. Similarly, the UE 115-*d* may receive first system information 405-*b* and may store and use the first system information 405-*b* for a second time duration associated with the SIB validity time 415-*b* (such that the second time duration avoids exceeding the SIB validity time 415-*b*). Upon expiration of the second time duration (e.g., upon expiration of the SIB validity time 415-*b* relative to the reception of the first system information 405-*b*, the UE 115-*d* may monitor or search for second system information 410-*b*.

Figure 5:
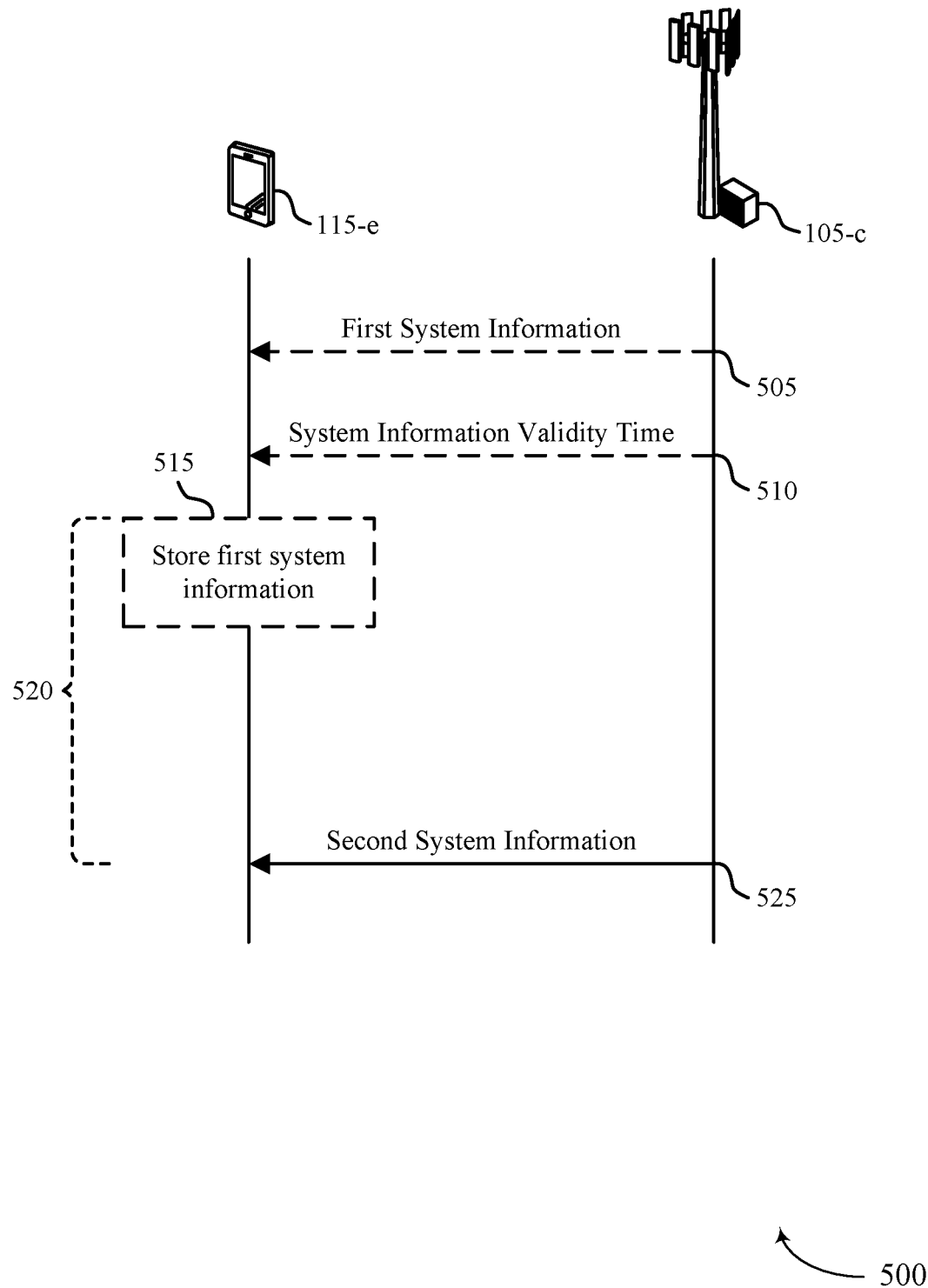
FIG. 5 illustrates an example of a process flow that supports device-specific system information validity times in accordance with one or more aspects of the present disclosure.

FIG. 5 illustrates an example of a process flow 500 that supports device-specific system information validity times in accordance with one or more aspects of the present disclosure. The process flow may implement or be implemented to realize aspects of the wireless communications system 100, the network architecture 200, the signaling diagram 300, or the system information acquisition timeline 400. For example, the process flow 500 illustrates communication between a network entity 105-*c* and a UE 115-*e*, each of which may be examples of corresponding devices as described herein. In some implementations, the network entity 105-*c* and the UE 115-*e* may support a signaling mechanism associated with enabling or facilitating device-specific SIB validity times.

At 505, the UE 115-*e* may receive, from the network entity 105-*c*, first system information (e.g., a first set of one or more SIBs) associated with the network entity 105-*c*. The UE 115-*e* may receive the first system information in accordance with a system information, paging, or access control procedure.

At 510, the UE 115-*e* may receive an indication of a system information validity time (e.g., a SIB validity time) that is specific to one or more of the UE 115-*e*, a device type of the UE 115-*e*, or a DRX cycle associated with the UE 115-*e*. In some implementations, the UE 115-*e* may receive the indication of the system information validity time from the network entity 105-*c* via the first system information received at 505. Additionally, or alternatively, the UE 115-*e* may retrieve the indication of the system information validity time from a storage of the UE 115-*e* and in accordance with a rule or specification (e.g., in accordance with a DRX cycle length of the UE 115-*e*). Additional details relating to how the UE 115-*e* may receive the indication of the system information validity time are described with reference to FIGS. 3 and 4.

At 515, the UE 115-*e* may store the first system information received at 505. In some aspects, the UE 115-*e* may store the first system information immediately after receiving the first system information at 505. In some implementations, the UE 115-*e* may store and use the first system information for a time duration 520 associated with the system information validity time that is specific to the UE 115-*e*. For example, the UE 115-*e* may expect the first system information to be valid for up to the indicated, selected, ascertained, or otherwise determined system information validity time.

At 525, the UE 115-*e* may monitor for second system information from the network entity 105-*c* in accordance with an expiration of the system information validity time at the UE 115-*e*. In some implementations, the network entity 105-*c* may transmit the second system information in accordance with the expiration of the system information validity time for the first system information at the UE 115-*e*. In some other implementations, the network entity 105-*c* may periodically broadcast system information and may refrain from changing a periodicity of the system information broadcasts based on the expiration of the stem information validity time for the first system information at the UE 115-*e*. In such implementations, the UE 115-*e* may begin monitoring for the second system information in accordance with the expiration of the system information validity time (e.g., slightly before expiration, at expiration, or slightly after expiration), but may not receive the second system information until the next periodic system information broadcast from the network entity 105-*c*.

Figure 6:
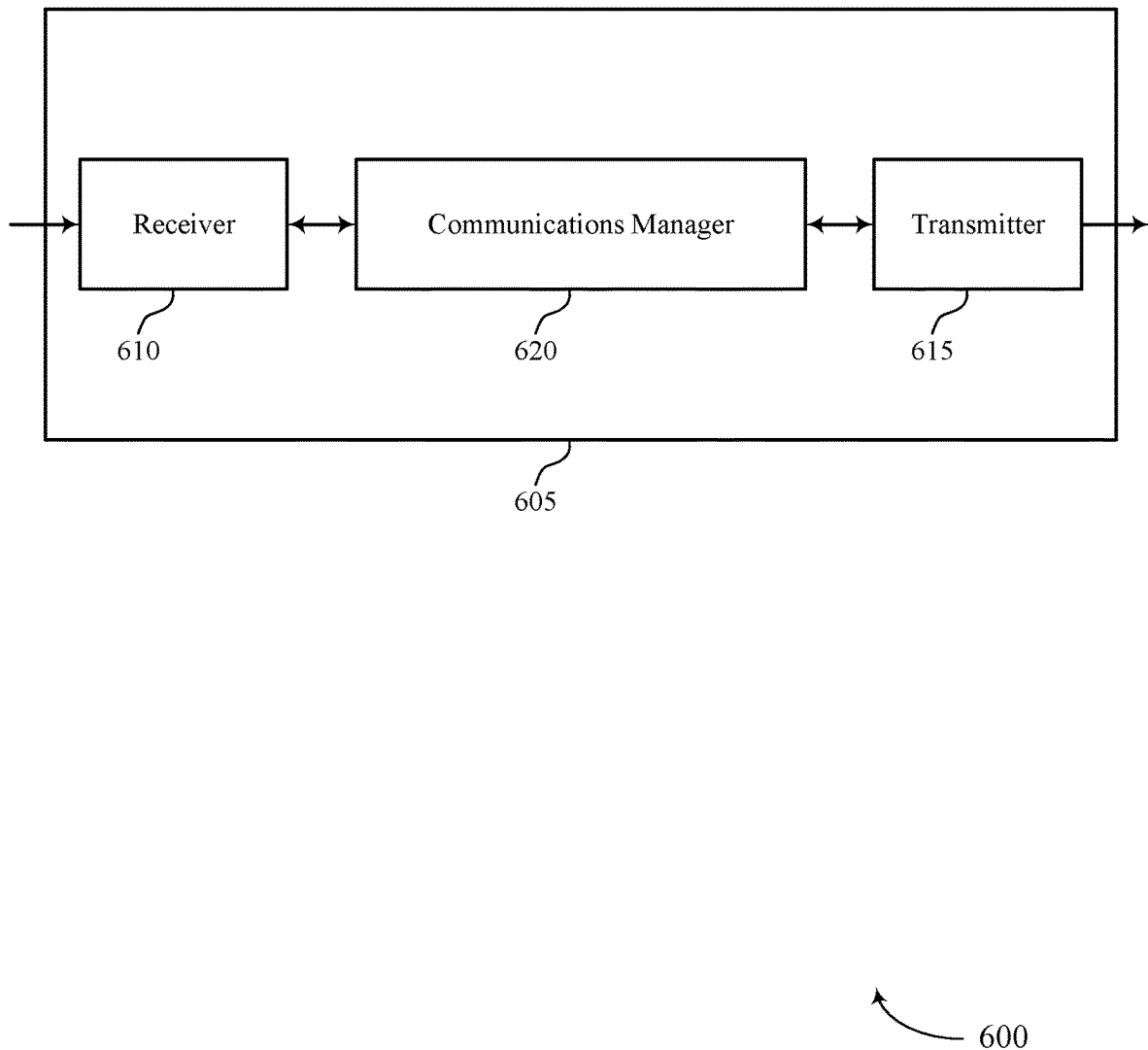
FIGS. 6 and 7 show block diagrams of devices that support device-specific system information validity times in accordance with one or more aspects of the present disclosure.

FIG. 6 shows a block diagram 600 of a device 605 that supports device-specific system information validity times in accordance with one or more aspects of the present disclosure. The device 605 may be an example of aspects of a UE 115 as described herein. The device 605 may include a receiver 610, a transmitter 615, and a communications manager 620. The device 605 may also include at least one processor. Each of these components may be in communication with one another (e.g., via one or more buses).

The receiver 610 may provide a means for receiving information such as packets, user data, control information, or any combination thereof associated with various information channels (e.g., control channels, data channels, information channels related to device-specific system information validity times). Information may be passed on to other components of the device 605. The receiver 610 may utilize a single antenna or a set of multiple antennas.

The transmitter 615 may provide a means for transmitting signals generated by other components of the device 605.

For example, the transmitter 615 may transmit information such as packets, user data, control information, or any combination thereof associated with various information channels (e.g., control channels, data channels, information channels related to device-specific system information validity times). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of device-specific system information validity times as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a at least one processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally, or alternatively, in some examples, the communications manager 620, the receiver 610, the transmitter 615, or various combinations or components thereof may be implemented in code (e.g., as communications management software) executed by at least one processor. If implemented in code executed by at least one processor, the functions of the communications manager 620, the receiver 610, the transmitter 615, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving an indication of a system information validity time, where the system information validity time is specific to one or more of: the UE, a device type of the UE, or a DRX cycle associated with the UE. The communications manager 620 may be configured as or otherwise support a means for monitoring for system information from a network entity in accordance with an expiration of the system information validity time at the UE.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
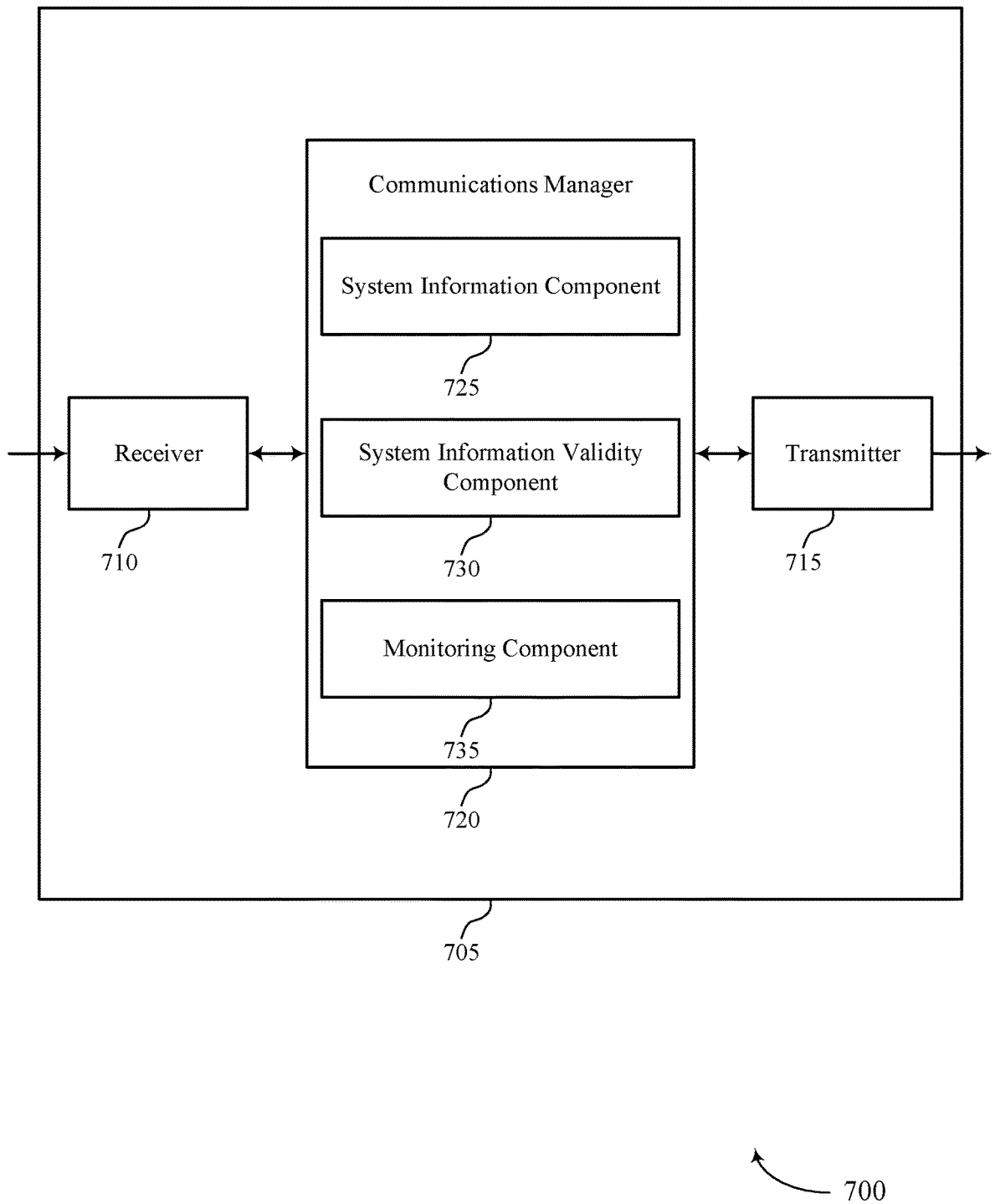

FIG. 7 shows a block diagram 700 of a device 705 that supports device-specific system information validity times in accordance with one or more aspects of the present disclosure. The device 705 may be an example of aspects of a device 605 or a UE 115 as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to device-specific system information validity times). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to device-specific system information validity times). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of device-specific system information validity times as described herein. For example, the communications manager 720 may include a system information component 725, a system information validity component 730, a monitoring component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The system information component 725 may be configured as or otherwise support a means for receiving first system information associated with a network entity. The system information validity component 730 may be configured as or otherwise support a means for receiving an indication of a system information validity time, where the system information validity time is specific to one or more of: the UE, a device type of the UE, or a DRX cycle associated with the UE. The monitoring component 735 may be configured as or otherwise support a means for monitoring for system information from a network entity in accordance with an expiration of the system information validity time at the UE.

Figure 8:
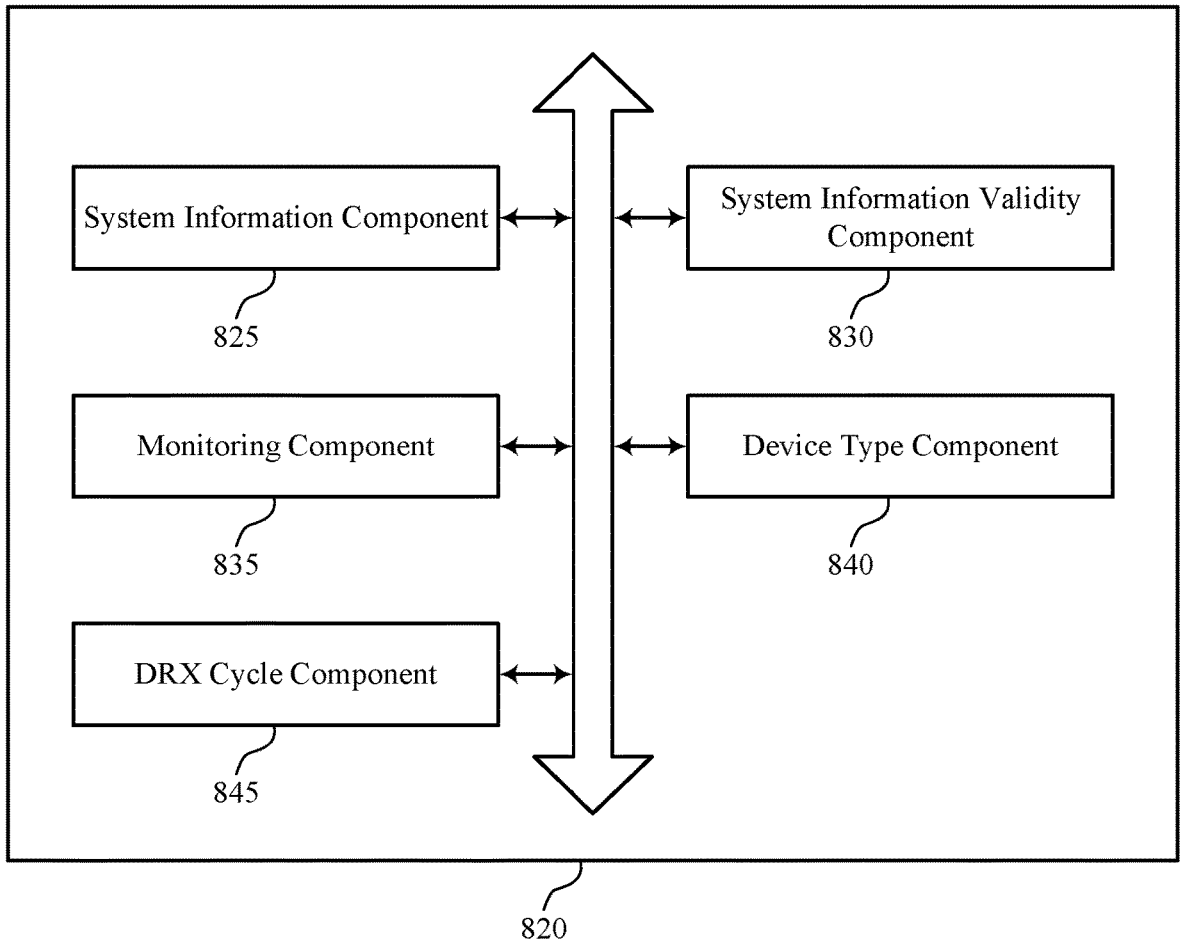
FIG. 8 shows a block diagram of a communications manager that supports device-specific system information validity times in accordance with one or more aspects of the present disclosure.

FIG. 8 shows a block diagram 800 of a communications manager 820 that supports device-specific system information validity times in accordance with one or more aspects of the present disclosure. The communications manager 820 may be an example of aspects of a communications manager 620, a communications manager 720, or both, as described herein. The communications manager 820, or various components thereof, may be an example of means for performing various aspects of device-specific system information validity times as described herein. For example, the communications manager 820 may include a system information component 825, a system information validity component 830, a monitoring component 835, a device type component 840, a DRX cycle component 845, or any combination thereof. Each of these components may communicate, directly or indirectly, with one another (e.g., via one or more buses).

The communications manager 820 may support wireless communication at a UE in accordance with examples as disclosed herein. The system information component 825 may be configured as or otherwise support a means for receiving first system information associated with a network entity. The system information validity component 830 may be configured as or otherwise support a means for receiving an indication of a system information validity time, where the system information validity time is specific to one or more of: the UE, a device type of the UE, or a DRX cycle associated with the UE. The monitoring component 835 may be configured as or otherwise support a means for monitoring for system information from a network entity in accordance with an expiration of the system information validity time at the UE.

In some examples, to support receiving the indication of the system information validity time, the device type component 840 may be configured as or otherwise support a means for receiving (via the first system information) an indication of a set of multiple system information validity times, where each respective system information validity time is associated with a different device type, and where a selection of the system information validity time from the set of multiple system information validity times is associated with the device type of the UE.

In some examples, a reduced capability device type is associated with a first system information validity time of the set of multiple system information validity times and a non-reduced capability device type is associated with a second system information validity time of the set of multiple system information validity times.

In some examples, to support receiving the indication of the system information validity time, the DRX cycle component 845 may be configured as or otherwise support a means for receiving (via the first system information) an indication of a set of multiple system information validity times, where each respective system information validity time is associated with a different DRX cycle length range, and where a selection of the system information validity time from the set of multiple system information validity times is associated with a DRX cycle length of the DRX cycle associated with the UE.

In some examples, to support receiving the indication of the system information validity time, the DRX cycle component 845 may be configured as or otherwise support a means for retrieving, from a storage of the UE, the system information validity time from a set of multiple system information validity times, wherein each respective system information validity time is associated with a different DRX cycle length range, and wherein a selection of the system information validity time from the set of multiple system information validity times is associated with a DRX cycle length of the DRX cycle associated with the UE.

In some examples, to support receiving the indication of the system information validity time, the DRX cycle component 845 may be configured as or otherwise support a means for receiving (via the first system information) an indication of a multiplier value and first system information validity time, where the system information validity time is equal to a larger of the first system information validity time and a product of a DRX cycle length of the DRX cycle associated with the UE and the multiplier value.

In some examples, the indication (e.g., the first system information) indicates a respective multiplier value and a respective first system information validity time for each DRX cycle length range of a set of multiple DRX cycle length ranges. In some examples, the multiplier value and the first system information validity time that the UE uses to calculate the system information validity time are associated with a DRX cycle length range that includes the DRX cycle length of the DRX cycle associated with the UE.

In some examples, to support receiving the indication of the system information validity time, the system information validity component 830 may be configured as or otherwise support a means for receiving the indication of the system information validity time from a core network entity or a radio access network entity in accordance with which of the core network entity or the radio access network entity configures a DRX mode at the UE, where the network entity includes one or both of the core network entity and the radio access network entity.

In some examples, to support receiving the indication of the system information validity time, the system information validity component 830 may be configured as or otherwise support a means for receiving a first indication of a first system information validity time from one of a core network entity or a radio access network entity in accordance with which of the core network entity or the radio access network entity configures a DRX mode at the UE. In some examples, to support receiving the indication of the system information validity time, the system information validity component 830 may be configured as or otherwise support a means for receiving a second indication of a second system information validity time (via the first system information), where the system information validity time is associated with a smaller of the first system information validity time and the second system information validity time.

Figure 9:
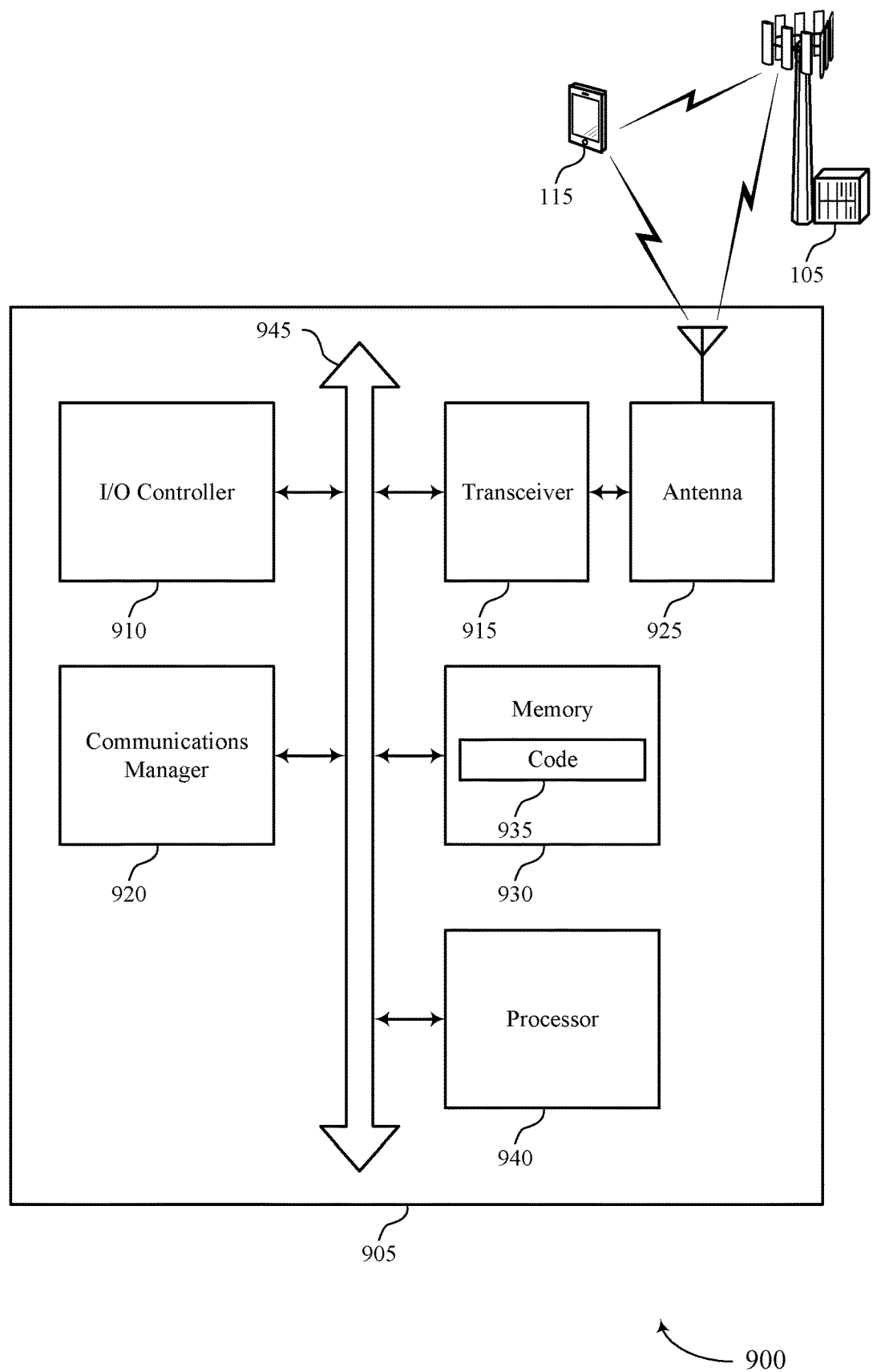
FIG. 9 shows a diagram of a system including a device that supports device-specific system information validity times in accordance with one or more aspects of the present disclosure.

FIG. 9 shows a diagram of a system 900 including a device 905 that supports device-specific system information validity times in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2t, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of at least one processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting device-specific system information validity times). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving first system information associated with a network entity. The communications manager 920 may be configured as or otherwise support a means for receiving an indication of a system information validity time, where the system information validity time is specific to one or more of: the UE, a device type of the UE, or a DRX cycle associated with the UE. The communications manager 920 may be configured as or otherwise support a means for monitoring for system information from a network entity in accordance with an expiration of the system information validity time at the UE.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of device-specific system information validity times as described herein, or the processor 940 and the memory 930 may be otherwise configured to perform or support such operations.

Figure 10:
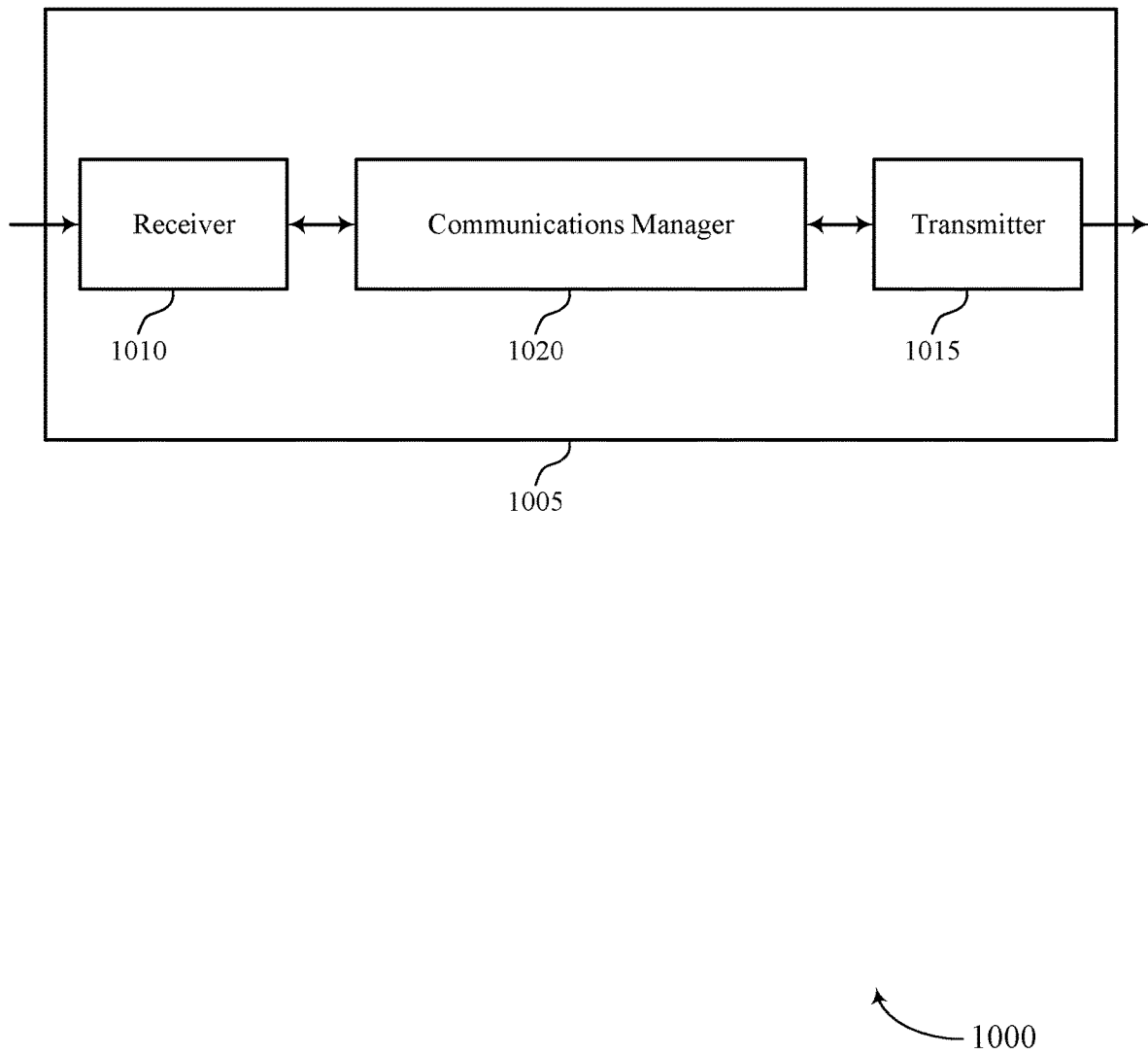
FIGS. 10 and 11 show block diagrams of devices that support device-specific system information validity times in accordance with one or more aspects of the present disclosure.

FIG. 10 shows a block diagram 1000 of a device 1005 that supports device-specific system information validity times in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include at least one processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of device-specific system information validity times as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include at least one processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally, or alternatively, in some examples, the communications manager 1020, the receiver 1010, the transmitter 1015, or various combinations or components thereof may be implemented in code (e.g., as communications management software) executed by at least one processor. If implemented in code executed by at least one processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting first system information associated with the network entity. The communications manager 1020 may be configured as or otherwise support a means for transmitting, to a UE, an indication of a system information validity time, where the system information validity time is specific to one or more of: the UE, a device type of the UE, or a DRX cycle associated with the UE. The communications manager 1020 may be configured as or otherwise support a means for transmitting second system information in accordance with an expiration of the system information validity time at the UE.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
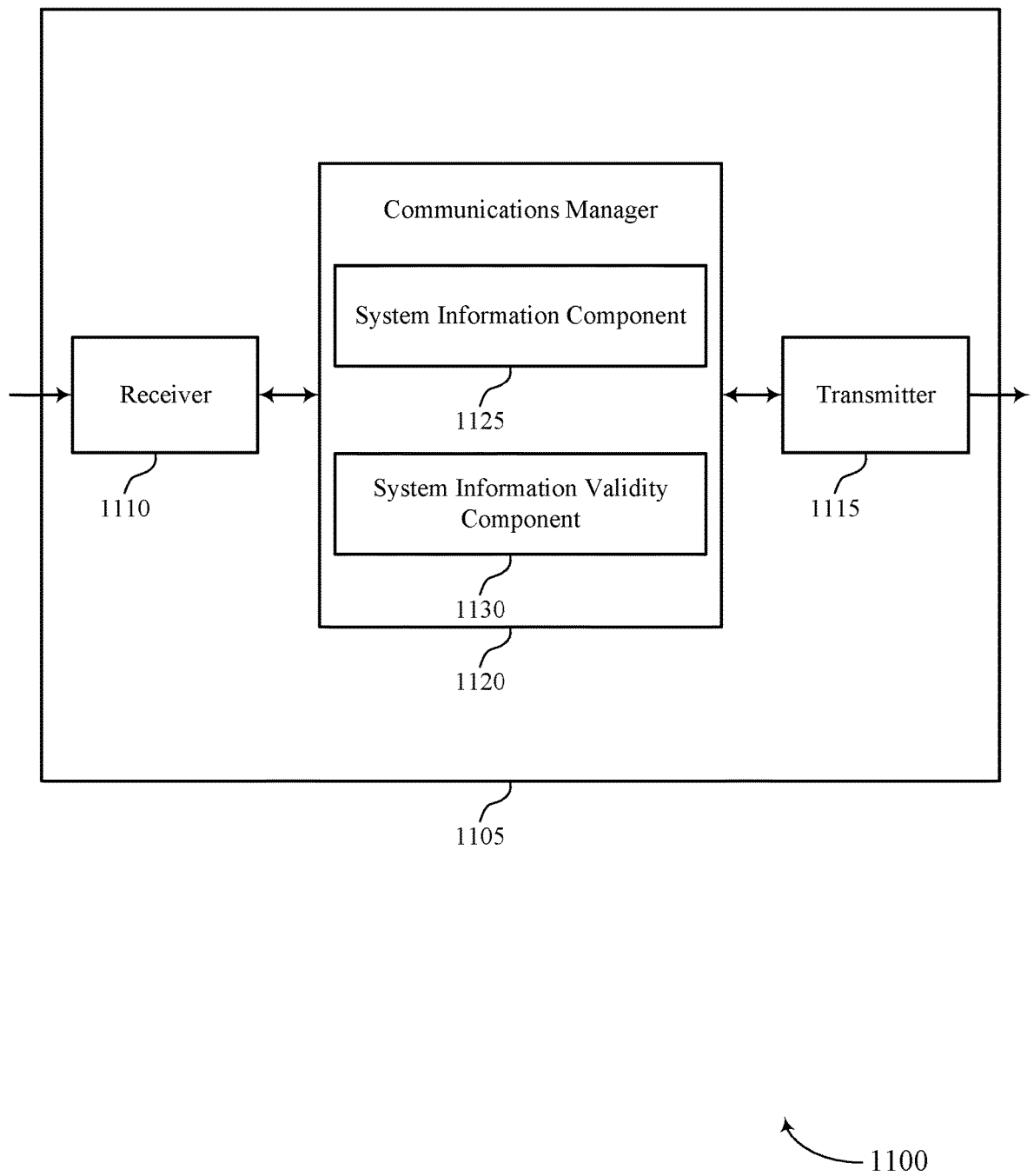

FIG. 11 shows a block diagram 1100 of a device 1105 that supports device-specific system information validity times in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of device-specific system information validity times as described herein. For example, the communications manager 1120 may include a system information component 1125 a system information validity component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The system information component 1125 may be configured as or otherwise support a means for transmitting first system information associated with the network entity. The system information validity component 1130 may be configured as or otherwise support a means for transmitting, to a UE, an indication of a system information validity time, where the system information validity time is specific to one or more of: the UE, a device type of the UE, or a DRX cycle associated with the UE. The system information component 1125 may be configured as or otherwise support a means for transmitting second system information in accordance with an expiration of the system information validity time at the UE.

Figure 12:
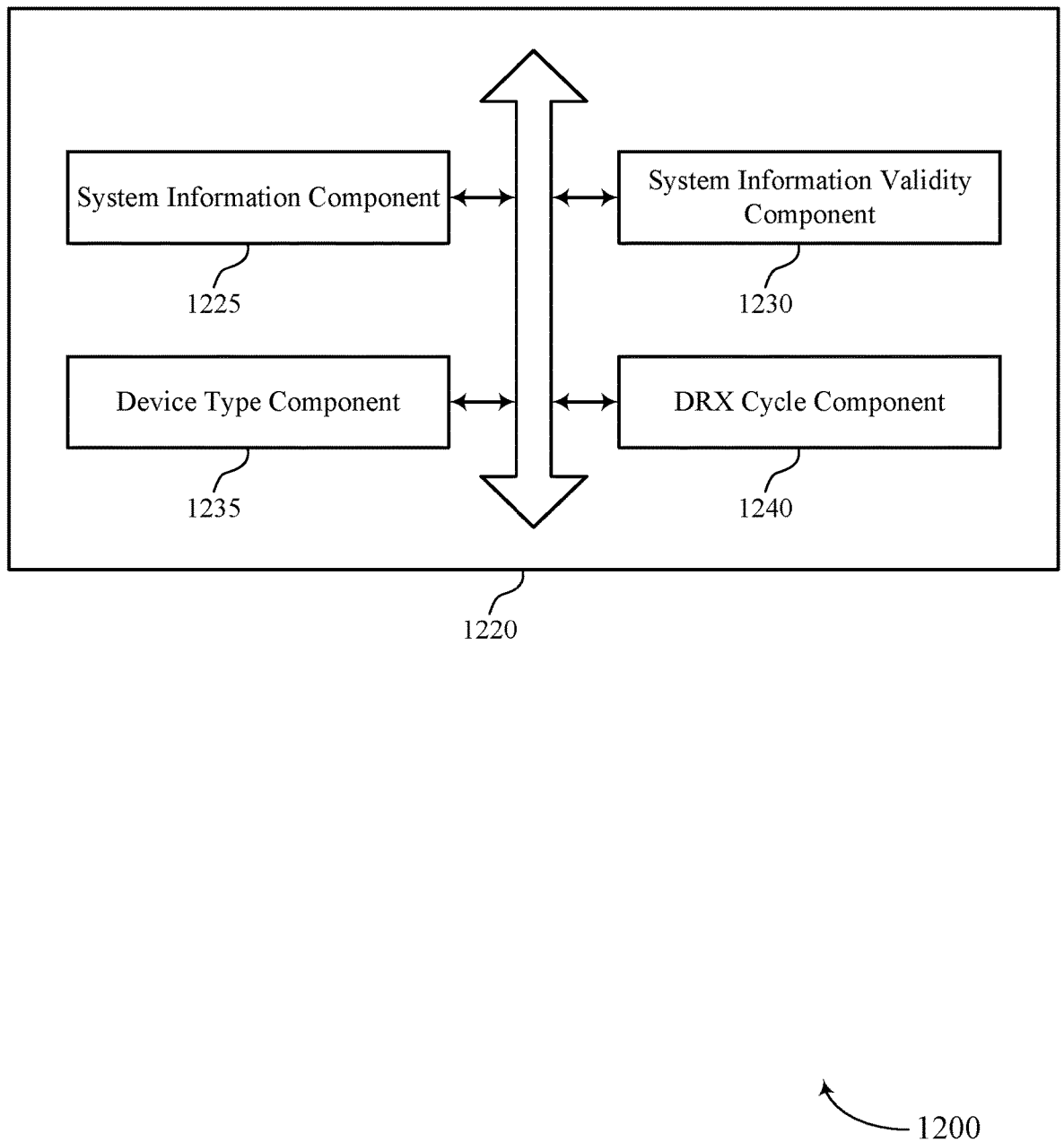
FIG. 12 shows a block diagram of a communications manager that supports device-specific system information validity times in accordance with one or more aspects of the present disclosure.

FIG. 12 shows a block diagram 1200 of a communications manager 1220 that supports device-specific system information validity times in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of device-specific system information validity times as described herein. For example, the communications manager 1220 may include a system information component 1225, a system information validity component 1230, a device type component 1235, a DRX cycle component 1240, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The system information component 1225 may be configured as or otherwise support a means for transmitting first system information associated with the network entity. The system information validity component 1230 may be configured as or otherwise support a means for transmitting, to a UE, an indication of a system information validity time, where the system information validity time is specific to one or more of: the UE, a device type of the UE, or a DRX cycle associated with the UE. In some examples, the system information component 1225 may be configured as or otherwise support a means for transmitting second system information in accordance with an expiration of the system information validity time at the UE.

In some examples, to support transmitting the indication of the system information validity time, the device type component 1235 may be configured as or otherwise support a means for transmitting (via the first system information) an indication of a set of multiple system information validity times, where each respective system information validity time is associated with a different device type, and where a selection of the system information validity time from the set of multiple system information validity times is associated with the device type of the UE.

In some examples, a reduced capability device type is associated with a first system information validity time of the set of multiple system information validity times and a non-reduced capability device type is associated with a second system information validity time of the set of multiple system information validity times.

In some examples, to support transmitting the indication of the system information validity time, the DRX cycle component 1240 may be configured as or otherwise support a means for transmitting (via the first system information) an indication of a set of multiple system information validity times, where each respective system information validity time is associated with a different DRX cycle length range, and where a selection of the system information validity time from the set of multiple system information validity times is associated with a DRX cycle length of the DRX cycle associated with the UE.

In some examples, to support transmitting the indication of the system information validity time, the DRX cycle component 1240 may be configured as or otherwise support a means for transmitting (via the first system information) an indication of a multiplier value and first system information validity time, where the system information validity time is equal to a larger of the first system information validity time and a product of a DRX cycle length of the DRX cycle associated with the UE and the multiplier value.

In some examples, the first system information indicates a respective multiplier value and a respective first system information validity time for each DRX cycle length range of a set of multiple DRX cycle length ranges. In some examples, the multiplier value and the first system information validity time associated with the system information validity time are associated with a DRX cycle length range that includes the DRX cycle length of the DRX cycle associated with the UE.

In some examples, to support transmitting the indication of the system information validity time, the system information validity component 1230 may be configured as or otherwise support a means for transmitting the indication of the system information validity time via a core network entity or a radio access network entity in accordance with which of the core network entity or the radio access network entity configures a DRX mode at the UE, where the network entity includes one or both of the core network entity and the radio access network entity.

In some examples, to support transmitting the indication of the system information validity time, the system information validity component 1230 may be configured as or otherwise support a means for transmitting a first indication of a first system information validity time via one of a core network entity or a radio access network entity in accordance with which of the core network entity or the radio access network entity configures a DRX mode at the UE. In some examples, to support transmitting the indication of the system information validity time, the system information validity component 1230 may be configured as or otherwise support a means for transmitting a second indication of a second system information validity time (via the first system information), where the system information validity time is associated with a smaller of the first system information validity time and the second system information validity time.

Figure 13:
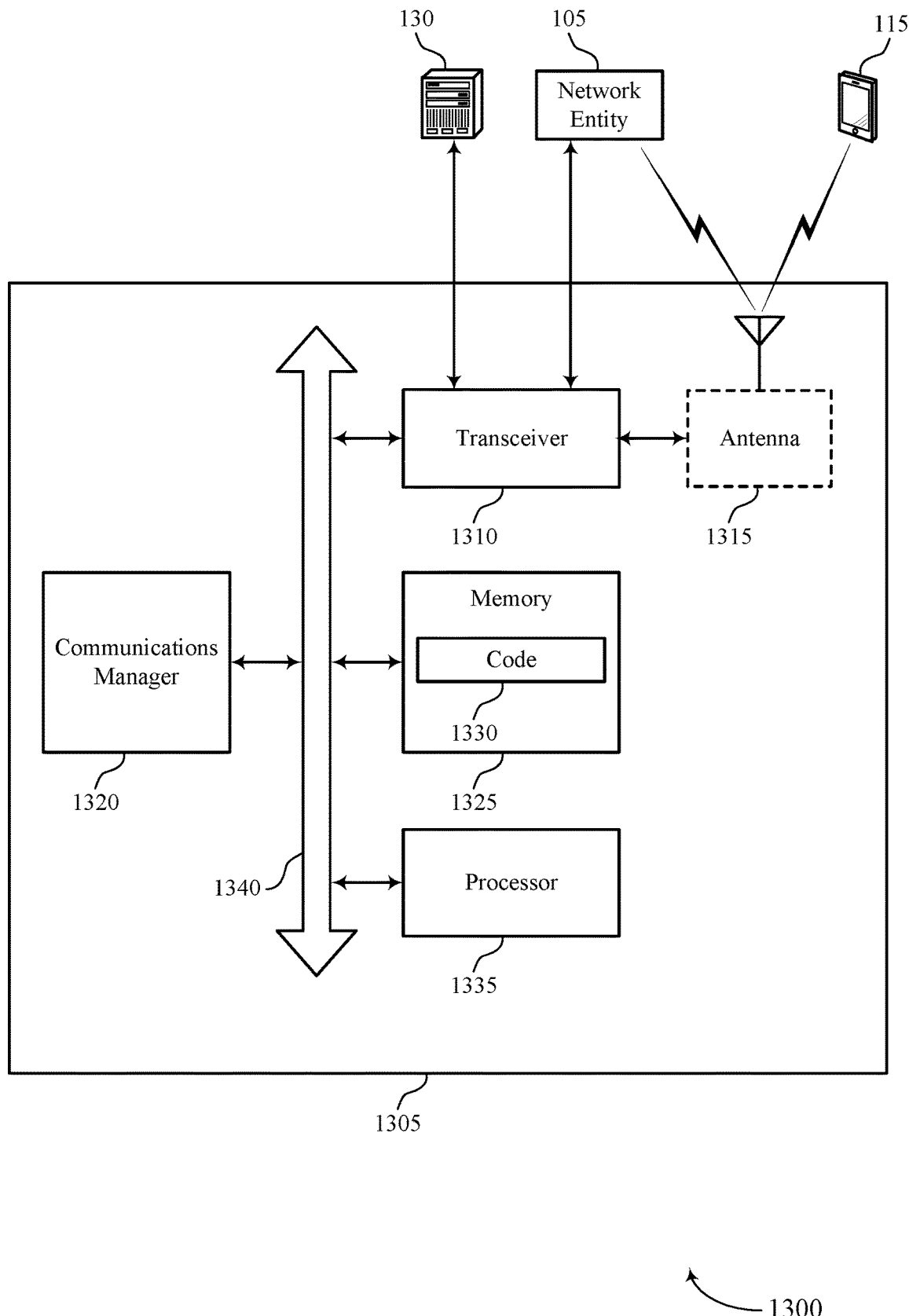
FIG. 13 shows a diagram of a system including a device that supports device-specific system information validity times in accordance with one or more aspects of the present disclosure.

FIG. 13 shows a diagram of a system 1300 including a device 1305 that supports device-specific system information validity times in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting device-specific system information validity times). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting first system information associated with the network entity. The communications manager 1320 may be configured as or otherwise support a means for transmitting, to a UE, an indication of a system information validity time, where the system information validity time is specific to one or more of: the UE, a device type of the UE, or a DRX cycle associated with the UE. The communications manager 1320 may be configured as or otherwise support a means for transmitting second system information in accordance with an expiration of the system information validity time at the UE.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of device-specific system information validity times as described herein, or the processor 1335 and the memory 1325 may be otherwise configured to perform or support such operations.

Figure 14:
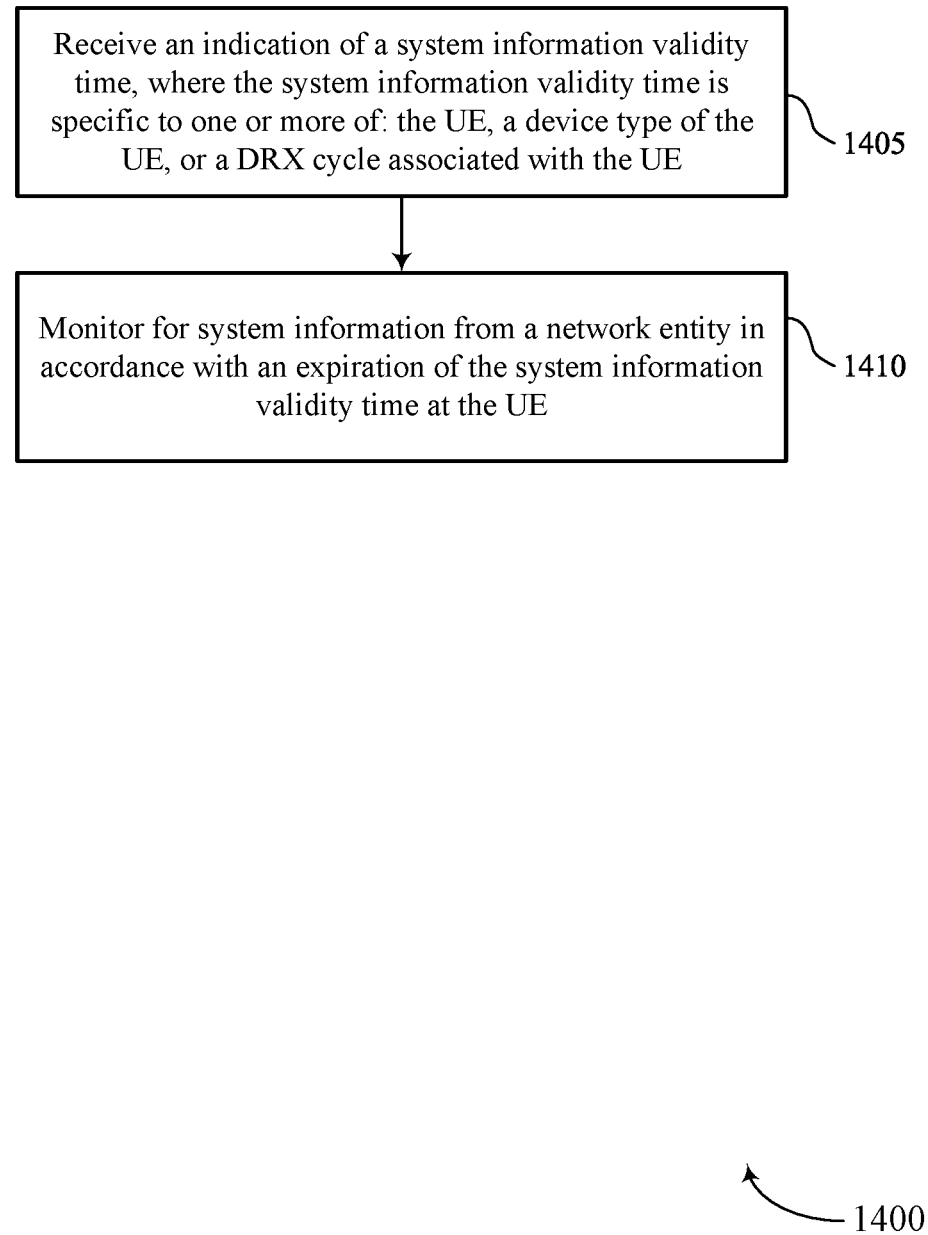
FIGS. 14 and 15 show flowcharts illustrating methods that support device-specific system information validity times in accordance with one or more aspects of the present disclosure.

FIG. 14 shows a flowchart illustrating a method 1400 that supports device-specific system information validity times in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of a system information validity time, where the system information validity time is specific to one or more of: the UE, a device type of the UE, or a DRX cycle associated with the UE. The operations of 1405 may be performed in accordance with examples as disclosed herein. In some examples, aspects of the operations of 1405 may be performed by a system information validity component 830 as described with reference to FIG. 8.

At 1410, the method may include monitoring for system information from a network entity in accordance with an expiration of the system information validity time at the UE. The operations of 1410 may be performed in accordance with examples as disclosed herein. In some examples, aspects of the operations of 1410 may be performed by a monitoring component 835 as described with reference to FIG. 8.

Figure 15:
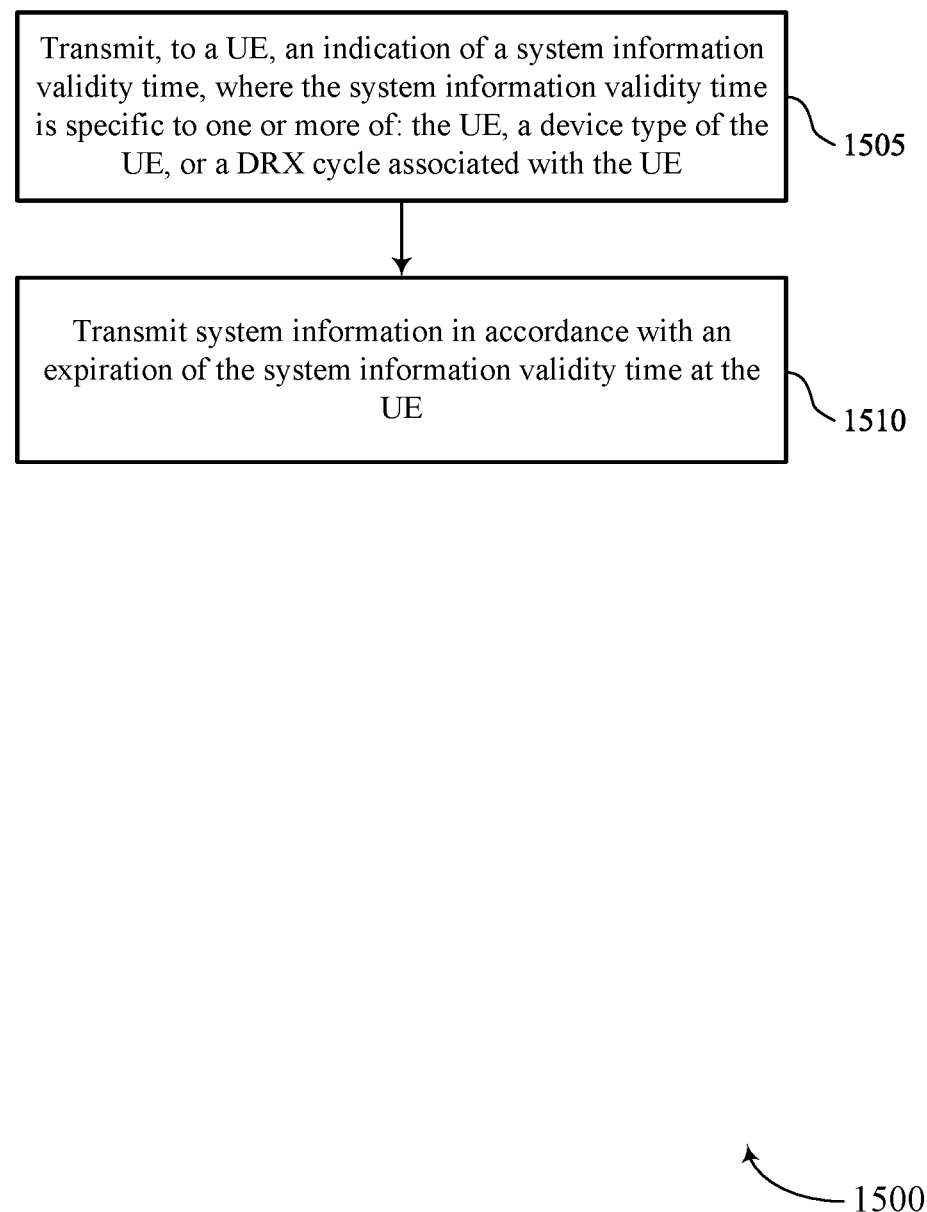

FIG. 15 shows a flowchart illustrating a method 1500 that supports device-specific system information validity times in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, an indication of a system information validity time, where the system information validity time is specific to one or more of: the UE, a device type of the UE, or a DRX cycle associated with the UE. The operations of 1505 may be performed in accordance with examples as disclosed herein. In some examples, aspects of the operations of 1505 may be performed by a system information validity component 1230 as described with reference to FIG. 12.

At 1510, the method may include transmitting second system information in accordance with an expiration of the system information validity time at the UE. The operations of 1510 may be performed in accordance with examples as disclosed herein. In some examples, aspects of the operations of 1510 may be performed by a system information component 1225 as described with reference to FIG. 12.

The following provides an overview of aspects of the present disclosure:

Aspect 1: A method for wireless communication at a UE, comprising: receiving an indication of a system information validity time, wherein the system information validity time is specific to one or more of: the UE, a device type of the UE, or a DRX cycle associated with the UE; and monitoring for system information from a network entity in accordance with an expiration of the system information validity time at the UE.

Aspect 2: The method of aspect 1, wherein receiving the indication of the system information validity time comprises: receiving an indication of a plurality of system information validity times, wherein each respective system information validity time is associated with a different device type, and wherein a selection of the system information validity time from the plurality of system information validity times is associated with the device type of the UE.

Aspect 3: The method of aspect 2, wherein a reduced capability device type is associated with a first system information validity time of the plurality of system information validity times and a non-reduced capability device type is associated with a second system information validity time of the plurality of system information validity times.

Aspect 4: The method of any of aspects 1 through 3, wherein receiving the indication of the system information validity time comprises: receiving an indication of a plurality of system information validity times, wherein each respective system information validity time is associated with a different DRX cycle length range, and wherein a selection of the system information validity time from the plurality of system information validity times is associated with a DRX cycle length of the DRX cycle associated with the UE.

Aspect 5: The method of any of aspects 1 through 4, wherein receiving the indication of the system information validity time comprises: retrieving, from a storage of the UE, the system information validity time from a plurality of system information validity times, wherein each respective system information validity time is associated with a different DRX cycle length range, and wherein a selection of the system information validity time from the plurality of system information validity times is associated with a DRX cycle length of the DRX cycle associated with the UE.

Aspect 6: The method of any of aspects 1 through 5, wherein receiving the indication of the system information validity time comprises: receiving an indication of a multiplier value and a first system information validity time, wherein the system information validity time is equal to a larger of the first system information validity time and a product of a DRX cycle length of the DRX cycle associated with the UE and the multiplier value.

Aspect 7: The method of aspect 6, wherein the indication indicates a respective multiplier value and a respective first system information validity time for each DRX cycle length range of a plurality of DRX cycle length ranges, and the multiplier value and the first system information validity time that the UE uses to calculate the system information validity time are associated with a DRX cycle length range that includes the DRX cycle length of the DRX cycle associated with the UE.

Aspect 8: The method of any of aspects 1 through 7, wherein receiving the indication of the system information validity time comprises: receiving the indication of the system information validity time from a core network entity or a radio access network entity in accordance with which of the core network entity or the radio access network entity configures a DRX mode at the UE, wherein the network entity includes one or both of the core network entity and the radio access network entity.

Aspect 9: The method of any of aspects 1 through 8, wherein receiving the indication of the system information validity time comprises: receiving a first indication of a first system information validity time from one of a core network entity or a radio access network entity in accordance with which of the core network entity or the radio access network entity configures a DRX mode at the UE; and receiving a second indication of a second system information validity time via a system information message, wherein the system information validity time is associated with a smaller of the first system information validity time and the second system information validity time.

Aspect 10: A method for wireless communication at a network entity, comprising: transmitting, to a UE, an indication of a system information validity time, where the system information validity time is specific to one or more of: the UE, a device type of the UE, or a DRX cycle associated with the UE; and transmitting system information in accordance with an expiration of the system information validity time at the UE.

Aspect 11: The method of aspect 10, wherein transmitting the indication of the system information validity time comprises: transmitting an indication of a plurality of system information validity times, wherein each respective system information validity time is associated with a different device type, and wherein a selection of the system information validity time from the plurality of system information validity times is associated with the device type of the UE.

Aspect 12: The method of aspect 11, wherein a reduced capability device type is associated with a first system information validity time of the plurality of system information validity times and a non-reduced capability device type is associated with a second system information validity time of the plurality of system information validity times.

Aspect 13: The method of any of aspects 10 through 12, wherein transmitting the indication of the system information validity time comprises: transmitting an indication of a plurality of system information validity times, wherein each respective system information validity time is associated with a different DRX cycle length range, and wherein a selection of the system information validity time from the plurality of system information validity times is associated with a DRX cycle length of the DRX cycle associated with the UE.

Aspect 14: The method of any of aspects 10 through 13, wherein transmitting the indication of the system information validity time comprises: transmitting an indication of a multiplier value and a first system information validity time, wherein the system information validity time is equal to a larger of the first system information validity time and a product of a DRX cycle length of the DRX cycle associated with the UE and the multiplier value.

Aspect 15: The method of aspect 14, wherein the indication indicates a respective multiplier value and a respective first system information validity time for each DRX cycle length range of a plurality of DRX cycle length ranges, and the multiplier value and the first system information validity time associated with the system information validity time are associated with a DRX cycle length range that includes the DRX cycle length of the DRX cycle associated with the UE.

Aspect 16: The method of any of aspects 10 through 15, wherein transmitting the indication of the system information validity time comprises: transmitting the indication of the system information validity time via a core network entity or a radio access network entity in accordance with which of the core network entity or the radio access network entity configures a DRX mode at the UE, wherein the network entity includes one or both of the core network entity and the radio access network entity.

Aspect 17: The method of any of aspects 10 through 16, wherein transmitting the indication of the system information validity time comprises: transmitting a first indication of a first system information validity time via one of a core network entity or a radio access network entity in accordance with which of the core network entity or the radio access network entity configures a DRX mode at the UE; and transmitting a second indication of a second system information validity time via a system information message, wherein the system information validity time is associated with a smaller of the first system information validity time and the second system information validity time.

Aspect 18: An apparatus for wireless communication at a UE, comprising at least one processor; memory coupled with the at least one processor; and instructions stored in the memory and executable by the at least one processor to cause the UE to perform a method of any of aspects 1 through 9.

Aspect 19: An apparatus for wireless communication at a UE, comprising at least one means for performing a method of any of aspects 1 through 9.

Aspect 20: A non-transitory computer-readable medium storing code for wireless communication at a UE, the code comprising instructions executable by at least one processor to perform a method of any of aspects 1 through 9.

Aspect 21: An apparatus for wireless communication at a network entity, comprising at least one processor; memory coupled with the at least one processor; and instructions stored in the memory and executable by the at least one processor to cause the network entity to perform a method of any of aspects 10 through 17.

Aspect 22: An apparatus for wireless communication at a network entity, comprising at least one means for performing a method of any of aspects 10 through 17.

Aspect 23: A non-transitory computer-readable medium storing code for wireless communication at a network entity, the code comprising instructions executable by at least one processor to perform a method of any of aspects 10 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by at least one processor, the functions may be stored as or transmitted using one or more instructions or code of a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), or ascertaining. Also, "determining" can include receiving (e.g., receiving information) or accessing (e.g., accessing data stored in memory). Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
at least one processor; and
memory coupled to the at least one processor, the memory storing instructions executable by the at least one processor to cause the UE to:
receive an indication of a system information validity time, wherein the system information validity time is specific to a device type of the UE and a selection of the system information validity time from a plurality of system information validity times is associated with the device type of the UE; and
monitor for system information from a network entity in accordance with an expiration of the system information validity time at the UE.

2. The apparatus of claim 1, wherein a reduced capability device type is associated with a first system information validity time of the plurality of system information validity times and a non-reduced capability device type is associated with a second system information validity time of the plurality of system information validity times.

3. An apparatus for wireless communication at a user equipment (UE), comprising:
at least one processor; and
memory coupled to the at least one processor, the memory storing instructions executable by the at least one processor to cause the UE to:
receive an indication of a plurality of system information validity times, wherein each respective system information validity time is associated with a different discontinuous reception cycle length range, and wherein a selection of a system information validity time from the plurality of system information validity times is associated with a discontinuous reception cycle length of a discontinuous reception cycle associated with the UE; and
monitor for system information from a network entity in accordance with an expiration of the system information validity time at the UE.

4. The apparatus of claim 3, wherein the instructions to receive are executable by the at least one processor to cause the UE to:
retrieve, from a storage of the UE, the system information validity time from the plurality of system information validity times.

5. The apparatus of claim 3, wherein the instructions to receive are further executable by the at least one processor to cause the UE to:
receive an indication of a multiplier value and a first system information validity time, wherein the system information validity time is equal to a larger of the first system information validity time and a product of the discontinuous reception cycle length of the discontinuous reception cycle associated with the UE and the multiplier value.

6. The apparatus of claim 5, wherein:
the indication indicates a respective multiplier value and a respective first system information validity time for each discontinuous reception cycle length range of a plurality of discontinuous reception cycle length ranges; and
the multiplier value and the first system information validity time that the UE uses to calculate the system information validity time are associated with a discontinuous reception cycle length range that includes the discontinuous reception cycle length of the discontinuous reception cycle associated with the UE.

7. The apparatus of claim 3, wherein the instructions to receive are further executable by the at least one processor to cause the UE to:
receive the indication from a core network entity or a radio access network entity in accordance with which of the core network entity or the radio access network entity configures a discontinuous reception mode at the UE, wherein the network entity includes one or both of the core network entity and the radio access network entity.

8. The apparatus of claim 3, wherein the instructions to receive the indication of the system information validity time are further executable by the at least one processor to cause the UE to:
receive a first indication of a first system information validity time from one of a core network entity or a radio access network entity in accordance with which of the core network entity or the radio access network entity configures a discontinuous reception mode at the UE; and
receive a second indication of a second system information validity time via a system information message, wherein the system information validity time is associated with a smaller of the first system information validity time and the second system information validity time.

9. An apparatus for wireless communication at a network entity, comprising:
at least one processor; and
memory coupled to the at least one processor, the memory storing instructions executable by the at least one processor to cause the network entity to:
transmit, to a user equipment (UE), an indication of a system information validity time, wherein the system information validity time is specific to a device type of the UE and a selection of the system information validity time from a plurality of system information validity times is associated with the device type of the UE; and
transmit system information in accordance with an expiration of the system information validity time at the UE.

10. The apparatus of claim 9, wherein a reduced capability device type is associated with a first system information validity time of the plurality of system information validity times and a non-reduced capability device type is associated with a second system information validity time of the plurality of system information validity times.

11. An apparatus for wireless communication at a network entity, comprising:
at least one processor; and memory coupled to the at least one processor, the memory storing instructions executable by the at least one processor to cause the network entity to:

transmit an indication of a plurality of system information validity times, wherein each respective system information validity time is associated with a different discontinuous reception cycle length range, and wherein a selection of a system information validity time from the plurality of system information validity times is associated with a discontinuous reception cycle length of a discontinuous reception cycle associated with the UE; and transmit system information in accordance with an expiration of the system information validity time at the UE.

12. The apparatus of claim 11, wherein the instructions to transmit the indication are further executable by the at least one processor to cause the network entity to:

transmit an indication of a multiplier value and a first system information validity time, wherein the system information validity time is equal to a larger of the first system information validity time and a product of the discontinuous reception cycle length of the discontinuous reception cycle associated with the UE and the multiplier value.

13. The apparatus of claim 12, wherein:

the indication indicates a respective multiplier value and a respective first system information validity time for each discontinuous reception cycle length range of a plurality of discontinuous reception cycle length ranges; and the multiplier value and the first system information validity time associated with the system information validity time are associated with a discontinuous reception cycle length range that includes the discontinuous reception cycle length of the discontinuous reception cycle associated with the UE.

14. The apparatus of claim 11, wherein the instructions to transmit the indication are further executable by the at least one processor to cause the network entity to:

transmit the indication via a core network entity or a radio access network entity in accordance with which of the core network entity or the radio access network entity configures a discontinuous reception mode at the UE, wherein the network entity includes one or both of the core network entity and the radio access network entity.

15. The apparatus of claim 11, wherein the instructions to transmit the indication are further executable by the at least one processor to cause the network entity to:

transmit a first indication of first system information validity time via one of a core network entity or a radio access network entity in accordance with which of the core network entity or the radio access network entity configures a discontinuous reception mode at the UE; and transmit a second indication of a second system information validity time via a system information message, wherein the system information validity time is associated with a smaller of the first system information validity time and the second system information validity time.

16. A method for wireless communication at a user equipment (UE), comprising:

receiving an indication of a system information validity time, wherein the system information validity time is specific to a device type of the UE and a selection of the system information validity time from a plurality of system information validity times is associated with the device type of the UE; and monitoring for system information from a network entity in accordance with an expiration of the system information validity time at the UE.

17. The method of claim 16, wherein a reduced capability device type is associated with a first system information validity time of the plurality of system information validity times and a non-reduced capability device type is associated with a second system information validity time of the plurality of system information validity times.

18. A method for wireless communication at a user equipment (UE), comprising:

receiving an indication of a plurality of system information validity times, wherein each respective system information validity time is associated with a different discontinuous reception cycle length range, and wherein a selection of a system information validity time from the plurality of system information validity times is associated with a discontinuous reception cycle length of a discontinuous reception cycle associated with the UE; and monitoring for system information from a network entity in accordance with an expiration of the system information validity time at the UE.

19. The method of claim 18, wherein receiving comprises:

retrieving, from a storage of the UE, the system information validity time from the plurality of system information validity times.

20. The method of claim 18, wherein the receiving further comprises:

receiving an indication of a multiplier value and first system information validity time, wherein the system information validity time is equal to a larger of the first system information validity time and a product of the discontinuous reception cycle length of the discontinuous reception cycle associated with the UE and the multiplier value.

21. The method of claim 20, wherein:

the indication indicates a respective multiplier value and a respective first system information validity time for each discontinuous reception cycle length range of a plurality of discontinuous reception cycle length ranges; and the multiplier value and the first system information validity time that the UE uses to calculate the system information validity time are associated with a discontinuous reception cycle length range that includes the discontinuous reception cycle length of the discontinuous reception cycle associated with the UE.

22. The method of claim 18, wherein the receiving further comprises:

receiving the indication from a core network entity or a radio access network entity in accordance with which of the core network entity or the radio access network entity configures a discontinuous reception mode at the UE, wherein the network entity includes one or both of the core network entity and the radio access network entity.

23. The method of claim 18, wherein the receiving further comprises:

receiving a first indication of a first system information validity time from one of a core network entity or a radio access network entity in accordance with which of the core network entity or the radio access network entity configures a discontinuous reception mode at the UE; and receiving a second indication of a second system information validity time via a system information message, wherein the system information validity time is associated with a smaller of the first system information validity time and the second system information validity time.

24. A method for wireless communication at a network entity, comprising:

transmitting, to a user equipment (UE), an indication of a system information validity time, wherein the system information validity time is specific to a device type of the UE and a selection of the system information validity time from a plurality of system information validity times is associated with the device type of the UE; and transmitting system information in accordance with an expiration of the system information validity time at the UE.

25. The method of claim 24 wherein a reduced capability device type is associated with a first system information validity time of the plurality of system information validity times and a non-reduced capability device type is associated with a second system information validity time of the plurality of system information validity times.

26. A method for wireless communication at a network entity, comprising:

transmitting an indication of a plurality of system information validity times, wherein each respective system information validity time is associated with a different discontinuous reception cycle length range, and wherein a selection of a system information validity time from the plurality of system information validity times is associated with a discontinuous reception cycle length of a discontinuous reception cycle associated with the UE; and transmitting system information in accordance with an expiration of the system information validity time at the UE.

* * * * *